US012725261B2

(12) United States Patent
Slomka et al.

(10) Patent No.: US 12,725,261 B2
(45) Date of Patent: Sep. 1, 2026

(54) CONVOLUTIONAL LONG SHORT-TERM MEMORY NETWORKS FOR RAPID MEDICAL IMAGE SEGMENTATION

(71) Applicant: CEDARS-SINAI MEDICAL CENTER, Los Angeles, CA (US)

(72) Inventors: Piotr Slomka, Los Angeles, CA (US); Aditya Killekar, Beverly Hills, CA (US); Sebastien Cadet, Los Angeles, CA (US); Damini Dey, Los Angeles, CA (US)

(73) Assignee: CEDARS-SINAI MEDICAL CENTER, Los Angeles, CA (US)

( * ) Notice: Subject to any disclaimer, the term of this patent is extended or adjusted under 35 U.S.C. 154(b) by 192 days.

(21) Appl. No.: 18/282,756

(22) PCT Filed: Mar. 18, 2022

(86) PCT No.: PCT/US2022/020954

§ 371 (c)(1),
(2) Date: Sep. 18, 2023

(87) PCT Pub. No.: WO2022/198050

PCT Pub. Date: Sep. 22, 2022

(65) Prior Publication Data

US 2025/0111516 A1 Apr. 3, 2025

Related U.S. Application Data

(60) Provisional application No. 63/301,222, filed on Jan. 20, 2022, provisional application No. 63/272,081, (Continued)

(51) Int. Cl.

| | |
|---|---|
| ***G06T 7/62*** | (2017.01) |
| ***G06T 7/00*** | (2017.01) |
| ***G06T 7/11*** | (2017.01) |

(52) U.S. Cl.
CPC .............. *G06T 7/11* (2017.01); *G06T 7/0012* (2013.01); *G06T 7/62* (2017.01); (Continued)

(58) Field of Classification Search
None
See application file for complete search history.

(56) References Cited

U.S. PATENT DOCUMENTS 10,579,865 B2 * 3/2020 Yoo ...................... G06V 10/454
2018/0373924 A1 * 12/2018 Yoo ...................... G06V 10/454
(Continued)

FOREIGN PATENT DOCUMENTS

WO 2021050765 A1 3/2021

OTHER PUBLICATIONS

International Search Report in International Patent Application No. PCT/US2022/020954 mailed Jun. 1, 2022, 2 pp.
(Continued)

*Primary Examiner* — Tsung Yin Tsai
(74) *Attorney, Agent, or Firm* — NIXON PEABODY LLP

(57) ABSTRACT

Convolutional long short-term memory (LSTM) networks are leveraged to segment and/or quantify medical imaging data. A multi-branch architecture makes use of an attention branch and a main branch. The main branch includes a dense block followed by a segmentation head, and is configured to consider a single input slice of the imaging data. This main branch is able to segment larger and easier-to-classify targets. The attention branch, however, makes use of a sequential processor that includes a convolutional LSTM (ConvLSTM) followed by a segmentation head and an attention head. This attention branch is configured to process an input slice and additional adjacent slices. This attention branch is able to segment smaller and more difficult to classify targets.

20 Claims, 12 Drawing Sheets

Related U.S. Application Data filed on Oct. 26, 2021, provisional application No. 63/249,354, filed on Sep. 28, 2021, provisional application No. 63/163,466, filed on Mar. 19, 2021.

(52) U.S. Cl.
CPC ............... *G06T 2207/10081* (2013.01); *G06T 2207/20081* (2013.01); *G06T 2207/20084* (2013.01); *G06T 2207/30096* (2013.01); *G06T 2207/30101* (2013.01)

(56) References Cited

U.S. PATENT DOCUMENTS

| | | | | |
|---|---|---|---|---|
| 2019/0130562 | A1 | 5/2019 | Liu et al. | |
| 2020/0167929 | A1 | 5/2020 | Wang | |
| 2021/0006755 | A1* | 1/2021 | Kim | H04N 25/13 |
| 2021/0398676 | A1* | 12/2021 | Evans | G16H 30/40 |
| 2022/0005168 | A1* | 1/2022 | Kim | G06T 7/001 |
| 2022/0384045 | A1* | 12/2022 | Zimmerman | A61B 5/0006 |
| 2023/0196567 | A1* | 6/2023 | Aykut | G06N 3/0455<br>382/128 |

OTHER PUBLICATIONS

Written Opinion in International Patent Application No. PCT/US2022/020954 mailed Jun. 1, 2022, 9 pp.
Ramanan, R.V. et al., "Incidental chest computed tomography findings in asymptomatic covid-19 patients. A multicentre indian perspective," The Indian Journal of Radiology & Imaging, vol. 31, No. Suppl 1, p. S45, 2021.
Rubin, G.D. et al., "The Role of Chest Imaging in Patient Management during the COVID-19 Pandemic: A Multinational Consensus Statement from the Fleischner Society." Radiology. 2020;296(1):172-180.
Saood A. and I. Hatem, COVID-19 lung CT image segmentation using deep learning methods: U-Net versus SegNet. BMC Medical Imaging, 2021. 21(1): p. 19.
Sharifpour, M. et al., "C-Reactive protein as a prognostic indicator in hospitalized patients with COVID-19." PLOS ONE. 2020;15(11):e0242400.
Shi, X., et al., Convolutional LSTM network: A machine learning approach for precipitation now casting. arXiv preprint arXiv: 1506.04214, 2015.
Tao, A., K. Sapra, and B. Catanzaro, Hierarchical multi-scae attention for semantic segmentation. arXiv preprint arXiv: 2005.10821, 2020.
Wang, G., et al.,, A Noise-Robust Framework for Automatic Segmentation of COVID-19 Pneumonia Lesions From CT Images. IEEE Trans Med Imaging, 2020. 39(8): p. 2653-2663.
Wang, Y., et al., Temporal Changes of CT Findings in 90 Patients with COVID-19 Pneumonia: A longitudinal study. Radiology, 2020. 296(2): p. E55-e64.
Xu, B., et al., Empirical evaluation of rectified activation in convolutional network. arXiv preprint arXiv: 1505.00853, 2015.
Yang, R., et al., Chest CT Severity Score: An Imaging Tool for Assessing Severe COVID-19. Radiology: Cardiothoracic Imaging, 2020. 2(2): p. e200047.
Zhang, K., et al., Clinically Aplicable AI System for Accurate Diagnosis, Quantitative Measurements, and Prognosis of Covid-19 Pneumonia Using Computed Tomography. Cell, 2020. 181(6): p. 1423-1433.e11.
Zhao, S., et al., Region mutual information loss for semantic segmentation. arXiv preprint arXiv: 1910.12037, 2019.
Ai, T., et al., Correlation of Chest CT and RT-PCR Testing for Coronavirus Disease 2019(COVID-19) in China: A Report of 1014 Cases. Radiology, 2020. 296(2): p. E32-E40.
Albano, D., et al., "Incidental findings suggestive of covid-19 in asymptomatic patients undergoing nuclear medicine procedures in a high-prevalence region," Journal of Nuclear Medicine, vol. 61, No. 5, pp. 632-636, 2020.
Ashari, M.A. et al., "Strategies for radiology departments in handling the COVID-19 pandemic." Diagn Interv Radiol. 2020;26(4):296-300.
Bai, H.X., et al., Artifical Intelligence Augmentation of Ragiologist Performance in Distinguishing COVID-19 from Pneumonia of Other Origin at Chest CT. Radiology, 2020. 296(3): p. E156-E165.
Bernheim, A., et al., Chest CT Findings in Coronavirus Disease-19 (COVID-19): Relationship to Duration of Infection. Radiology, 2020. 295(3): p. 200463.
Boger, B., et al., Systematic review with meta-analysis of the accuracy of diagnostic tests for COVID-19. Am J Infect Control, 2021. 49(1): p. 21-29.
Chaganti, S., et al., Automated Quantification of CT Patterns Associated with COVID-19 from Chest CT. Radiology: Aritificial Intelligence, 2020. 2(4): p. e20048.
Chang, Y.-C. et al., "Pulmonary Sequelae in Convalescent Patients after Severe Acute Respiratory Syndrome: Evaluation with Thin-Section CT." Radiology. 2005;236(3):1067-1075.
Chartrand, G. et al., "Deep Learning: A Primer for Radiologists." RadioGraphics. 2017;37(7):2113-2131.
Cicek, O., et al., 3D U-Net: learning dense volumetric segmentation from sparse annotation. in International conference on medical image computing and computer-assissted intervention. 2016. Springer.
Colombi, D. et al. "Well-aerated Lung on Admitting Chest CT to Predict Adverse Outcome in COVID-19 Pneumonia." Radiology. 2020;296(2):E86-e96.
Commandeur, F., et al., Deep Learning for Quantification of Epicardial and Thoracic Adipose Tissue From Non-Contrast CT. IEEE Trans Med Imaging, 2018. 37(8): p. 1835-1846.
De Gonzalez, A.B., et al., "Projected cancer risks from computed tomographic scans performed in the united states in 2007," Archives of internal medicine, vol. 169, No. 22, pp. 2071-2077, 2009.
DeLong, E.R. et al., "Comparing the areas under two or more correlated receiver operating characteristic curves: a nonparametric approach." Biometrics. 1988;44(3):837-845.
Deng, J. et al., "Imagenet: A large-scale hierarchical image database," in 2009 IEEE conference on computer vision and pattern recognition, pp. 248-255, IEEE, 2009.
Extended European Search Report in Europan Patent Application No. 22772290.7, mailed Dec. 19, 2024 (8 pages).
Fan, D.-P. et al., "Inf-net: Automatic covid-19 lung infection segmentation from ct images," IEEE Transactions on Medical Imaging, vol. 39, No. 8m pp. 2626-2637, 2020.
Francone, M., et al., Chest CT score in COVID-19 patients: correlatoin with disease severity and short-term prognisis. Eur Radiol, 2020. 30(12): p. 6808-6817.
Gieraerts, C., et al., Prognostic Value and Reproductibility of AI-assisted Analysis of Lung Involvement in COVID-19 on Low-Dose Submilisievert Chest CT: Sample Size Implications for Clinical Trials. Radiology: Cardiothoracic Imaging, 2020. 2(5): p. 200441.
Gietema, H.A. et al., "Quantifying the Extent of Emphysema:: Factors Associated with Radiologists' Estimations and Quantitative Indices of Emphysema Severity Using the ECLIPSE Cohort." Academic Radiology. 2011;18(6):661-671.
Glorot, X. et al., "Understanding the difficulty of training deep feedforward neural networks," in Proceedings of the thirteenth international conference on artificial intelligence and statistics, pp. 249-256, JMLR Workshop and Conference Proceedings, 2010.
Grodecki, K. et al., "Rapid quantification of COVID-19 pneumonia burden from computed tomography with convolutional LSTM networks." ArXiv. 2021:arXiv:2104.00138v00131.
Grodecki, K., et al., Epicardial adipose tissue is assicoated with extent of pneumonia and adverse outcomes in patients with COVID-19. Metabolism, 2021. 115L p. 154436.
Grodecki, K., et al., Quantitative Burden of COVID-19 Pneumonia on Chest CT Predicts Adverse Outcomes: A Post-Hoc Analysis of a Prospective International Registry. Radiology: Cardiothoracic Imaging, 2020. 2(5): p. e200389.
Guan, X. et al., "Quantitative and semi-quantitative CT assessments of lung lesion burden in COVID-19 pneumonia." Scientific Reports. 2021;11(1):5148.

(56) References Cited

OTHER PUBLICATIONS

Guendel, S. et al. "Multi-task learning for chest x-ray abnormality classification on noisy labels." arXiv preprint arXiv:1905.06362 (2019).
Habouzit, V. et al., "Incidental finding of covid-19 lung infection in 18f-fdg pet/ct: What should we do?," Clinical nuclear medicine, 2020.
Hansell, D.M. et al., "Society: glossary of terms for thoracic imaging." Radiology. 2008;246(3):697-722.
He, K., et al., Delving deep into rectifiers: Surpassing human-level performance on imagenet classification. in Proceedings of the IEEE international conference on computer vision. 2015.
Henry, B.M. et al., "Lactate dehydrogenase levels predict coronavirus disease 2019 (COVID-19) severity and mortality: A pooled analysis." Am J Emerg Med. 2020;38(9):1722-1726.
Huang, G., et al. Densely connected convolutional networks. in Proceedings of the IEEE conference on computer vision and pattern recognition. 2017.
Kazerooni, E.A. et al. "Thin-section CT obtained at 10-mm increments versus limited three-level thin-section CT for idiopathic pulmonary fibrosis: correlation with pathologic scoring." AJR Am J Roentgenol. 1997;169(4):977-983.
Khatami, F., et al., A meta-analysis of accuracy and sensitivity of chest CT and RT-PCR in COVID-19 diagnosis. Sci Rep, 2020. 10(1): p. 22402.
Kingma, D.P. et al., "Adam: A method for stochastic optimization," arXiv preprint arXiv:1412.6980, 2014.
Krizhevsky, A., I. Sutskever, and G.E. Hinton, Imagenet classification with deep convolutional nerual networks. Advances in neural information processing systems, 2012. 25: p. 1097-1105.
Landis, J.R. et al., "The Measurement of Observer Agreement for Categorical Data." Biometrics. 1977;33(1):159-174.
Ledig, C. et al., "Photo-realistic single image super-resolution using a generative adversarial network," in Proceedings of the IEEE conference on computer vision and pattern recognition, pp. 4681-4690, 2017.
Li, K., et al., CT image visual quantitative evaluation and clinical classification of coronavirus disease (COVID-19)). Eur Radiol, 2020. 30(8): p. 4407-4416.
Li, L., et al., Using Artificial Intellifence to Detect COVID-19 and Community-acquired Pneumonia Based on Pulmonary CT: Evaluation of the Diagnostic Accuracy. Radiology, 2020. 296(2): p. E65-E-71.
Li, S. et al., "Predictive value of chest CT scoring in COVID-19 patients in Wuhan, China: A retrospective cohort study." Respiratory Medicine. 2021; 176:106271.
Lin, T.-Y. et al., "Focal loss for dense object detection," in Proceedings of the IEEE international confrence on computer vision, pp. 2980-2988, 2017.
Meyes, R., "Ablation studies in artificial neural networks," arXiv preprint arXiv:1901.08644, 2019.
Milletari F., N. Navab, and S.-A. Ahmadi. V-net: Fully convolutional neural networks for volumetric medical image segmentation. In 2016 fourth international conference on 3D vision (3DV). 2016. IEEE.
Morozov, S. et al., "Mosmeddata: Chest ct scans with covid-19 related findings dataset," arXiv preprint arXiv:2005.06465, 2020.
Neveu, S. et al., "Incidental diagnosis of covid-19 pneumonia on chest computed tomography," Diagnostic and interventional imaging, vol. 101, No. 7-8, pp. 457-461, 2020.
Nunes, N. et al., "A multi-modal deep learning method for classifying chest radiology exams." Advances in Databases and Information Systems; (Lecture Notes in Computer Science; Lect. Notes Computer), Springer International Publishing, Cham, 2019: pp. 323-335.
Pallardy, A. et al., "Incidental findings suggestive of covid-19 in asymptomatic cancer patients undergoing 18f-fdg pet/ct in a low prevalence region," European Journal of Nuclear Medicine and Molecular Imaging, vol. 48, No. 1, pp. 287-292, 2021.
Pan, F., et al., Time Course of Lung Changes at Chest CR during Recovery from Coronavirus Disease 2019 (COVID-19). Radiology, 2020. 295(3): p. 715-721.
Pencina, M.J. et al., Extensions of net reclassification improvement calculations to measure the usefulness of new biomarkers. Stat Med. 2011;30(1):11-21.
Pfeuffer, A. et al., "Semantic segmentation of video sequences with convolutional Istms," in 2019 IEEE Intelligent Vehicles Symposium (IV), pp. 1441-1447, IEEE, 2019.

* cited by examiner

CONVOLUTIONAL LONG SHORT-TERM MEMORY NETWORKS FOR RAPID MEDICAL IMAGE SEGMENTATION

CROSS REFERENCE TO RELATED APPLICATIONS

The present application is a National Stage 371 Application of PCT/US2022/020954 filed Mar. 18, 2022 and entitled "CONVOLUTIONAL LONG SHORT-TERM MEMORY NETWORKS FOR RAPID MEDICAL IMAGE SEGMENTATION," which claims the benefit of U.S. Provisional Patent Application No. 63/163,466 filed Mar. 19, 2021 and entitled "APPLICATION OF CONVOLUTIONAL LSTM NETWORKS FOR THE SEGMENTATION OF 3D MEDICAL IMAGES," U.S. Provisional Patent Application No. 63/249,354 filed Sep. 28, 2021 and entitled "RAPID QUANTIFICATION OF COVID-19 PNEUMONIA BURDEN FROM COMPUTED TOMOGRAPHY WITH CONVOLUTIONAL LSTM NETWORKS," U.S. Provisional Patent Application No. 63/272,081 filed Oct. 26, 2021 and entitled "CALCIUM SCORING IN LOW-DOSE UNGATED CHEST CT SCANS USING CONVOLUTIONAL LONG-SHORT TERM MEMORY NETWORKS," and U.S. Provisional Patent Application No. 63/301,222 filed Jan. 20, 2022 and entitled "CONVOLUTIONAL LONG SHORT-TERM MEMORY NETWORKS FOR RAPID MEDICAL IMAGE SEGMENTATION," the disclosures of which are hereby incorporated by reference in their entirety.

STATEMENT REGARDING FEDERALLY SPONSORED RESEARCH OR DEVELOPMENT

This invention was made with government support under Grant Nos. HL089765 and HL161195, awarded by the National Institutes of Health. The government has certain rights in the invention.

TECHNICAL FIELD

The present disclosure relates to medical imaging generally and more specifically to improvements in automated segmentation and analysis of medical images.

BACKGROUND

Medical images, such as scans from Positron Emission Tomography (PET) machines, Computed Tomography (CT) machines, magnetic resonance imaging (MRI) machines, or other imaging devices, can be used to diagnose a wide variety of conditions in patients. Once imaging data is obtained, however, it must still be reviewed to identify what is shown in the images.

Generally, medical imaging data is reviewed by experts (e.g., medical professionals, such as physicians trained in a particularly relevant field of medicine) manually. These experts will review the images and make a diagnosis about the patient based on what the expert sees in the images.

In some cases, experts make use of semi-automated algorithms that allow the expert to manually segment regions of the medical image, identifying those regions as particular tissue or regions of interest, after which the semi-automated algorithm attempts to provide some form of quantitative measurement based on the expert's segmentations. This process, however, is extremely time-intensive and cost-intensive, as it requires manual segmentation slice-by-slice by the expert. As a result, such processes are unsuitable for many workflows, such as triage in emergent situations or pandemic situations. Additionally, the relatively large amount of time and cost involved in these types of reviews may deter patients and/or physicians from using them.

Further, since each expert may segment the same images differently, such as due to subjective differences, differences in training, or procedural differences in each expert's workplace, any quantitative measurements dependent on manual segmentation are inherently subject to a relatively large amount of variance. Also, further variance can be introduced whenever an expert segments fewer than all available image slices from an imaging study.

Additionally, some common practices involve subjecting a patient to multiple imaging studies to obtain certain diagnostic data. Each imaging study to which a patient is subjected can increase costs expended, exposure to radiation (e.g., x-ray radiation from CT scans), time the patient must spend being imaged, time until a diagnosis is obtained, time the imaging machine is occupied, and other detrimental effects. In an example, it is common for patients with diagnosed or suspected coronary artery diseases to have PET scans performed, which are acquired with CT attenuation correction scans. However, if a coronary artery calcium (CAC) assessment is desired, the patient commonly undergoes a separate non-contrast CT scan to obtain the imaging data experts traditionally use to generate CAC scores. This additional CT scan requires the patient be exposed to additional ionizing radiation.

There is a need for techniques to automatically interpret medical imaging data in a rapid and reliable fashion. There is a need for techniques that can automatically segment and/or quantify medical imaging data with minimal expert intervention. There is a need for techniques that can automatically segment and/or quantify medical imaging data without the need for expert, manual intervention. There is also a need for techniques that can automatically interpret medical imaging data from fewer imaging studies, reducing the number of imaging studies and amount of radiation to which a patient is exposed.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, supplemented by this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Embodiments of the present disclosure include a method, including receiving medical imaging data containing a plurality of ordered image slices. The method further includes accessing a multi-branch model associated with a target. The multi-branch model includes a main branch and an attention branch. The main branch includes a densely connected convolutional network (DenseNet). The attention branch includes a convolutional long short-term memory network (ConvLSTM). The multi-branch model is trained to receive sequential image slices and, for each sequential image slice, output a target mask indicative of one or more target regions within the sequential image slice identified as being the target. The method further includes providing the plurality of ordered image slices to the multi-branch model. The method further includes generating, by the multi-branch model, a plurality of output target masks in response to providing the plurality of ordered image slices to the multi-branch model.

In some cases, the method further comprises generating a quantitative score using the plurality of output target masks, wherein the quantitative score is indicative of a severity of a condition associated with the target. In some cases, generating the quantitative score includes: calculating a total target volume using the plurality of output target masks; and generating a quantitative score using the total target volume. In some cases, generating the quantitative score includes: i) generating a coronary artery calcium score, wherein the target is calcium, and wherein the plurality of ordered image slices is associated with a computed tomography attenuation correction scan; ii) generating a pneumonia burden score, wherein the target includes at least one of a ground-glass opacity lesion and a high opacity lesion, and wherein the plurality of ordered image slices is associated with a computed tomography study of a pleural cavity; iii) generating a plaque volume measurement, wherein the target is plaque buildup, and wherein the plurality of ordered image slices is associated with a coronary computed tomography angiography study; or iv) generating a stenosis severity score, wherein the target is plaque buildup, and wherein the plurality of ordered image slices is associated with a coronary computed tomography angiography study.

In some cases, the main branch includes the DenseNet followed by a first segmentation head, wherein the attention branch includes the ConvLSTM feeding into a second segmentation head and an attention head, and wherein a first output of the first segmentation head, a second output of the second segmentation head, and a third output of the attention head are used to generate the target mask. In some cases, for each image slice of the plurality of ordered image slices, generating the plurality of output target masks includes: generating a main branch output by performing elementwise multiplication of the first output and the third output; generating an attention branch output by performing elementwise multiplication of the second output and the third output; and generating a respective output target mask by performing elementwise addition of the main branch output and the attention branch output. In some cases, each of the first segmentation head, the second segmentation head, and the attention head includes a 3×3 convolutional layer followed by a batch layer, followed by a leaky rectified linear unit layer, followed by an additional 3×3 convolutional layer, followed by an additional batch layer, followed by an additional leaky rectified linear unit layer, followed by a 1×1 convolutional layer, and wherein the attention head further includes a sigmoid layer following the 1×1 convolutional layer.

In some cases, the method further comprises accessing an additional multi-branch model, wherein the multi-branch model is trained for segmentation according to the target, and wherein the additional multi-branch model is trained for segmentation according to an additional target; providing the plurality of ordered image slices to the additional multi-branch model; generating, by the additional multi-branch model, a plurality of output additional target masks in response to providing the plurality of ordered image slices to the additional multi-branch model, wherein the plurality of output additional target masks are indicative of one or more additional target regions within the plurality of ordered image slices identified as being the additional target; and applying the plurality of output additional target masks to the plurality of output target masks to generate a quantitative score, wherein the quantitative score is indicative of a severity of a condition associated with the one or more targets.

In some cases, the method further comprises training the multi-branch model using a set of training data, wherein the set of training data includes a plurality of manually annotated image sets, wherein each of the plurality of manually annotated image sets includes a plurality of ordered, annotated image slices, and wherein each respective image slice of the plurality of ordered, annotated image slices includes at least one manually-applied annotation indicative of an identified target region within the respective image slice.

In some cases, the method further comprises presenting the medical imaging data using a display device, wherein presenting the medical imaging data using the display device includes applying a visually distinguishable feature to the medical imaging data based on the plurality of output target masks such that the one or more target regions visible in the medical imaging data are visually distinguishable from other regions within the medical imaging data.

Embodiments of the present disclosure include a system comprising one or more data processors; and a non-transitory computer-readable storage medium containing instructions which, when executed on the one or more data processors, cause the one or more data processors to perform the above method(s).

Embodiments of the present disclosure include a computer-program product tangibly embodied in a non-transitory machine-readable storage medium, including instructions configured to cause a data processing apparatus to perform the above method(s).

BRIEF DESCRIPTION OF THE DRAWINGS

The specification makes reference to the following appended FIGURES, in which use of like reference numerals in different FIGURES is intended to illustrate like or analogous components.

DETAILED DESCRIPTION

Figure 1:
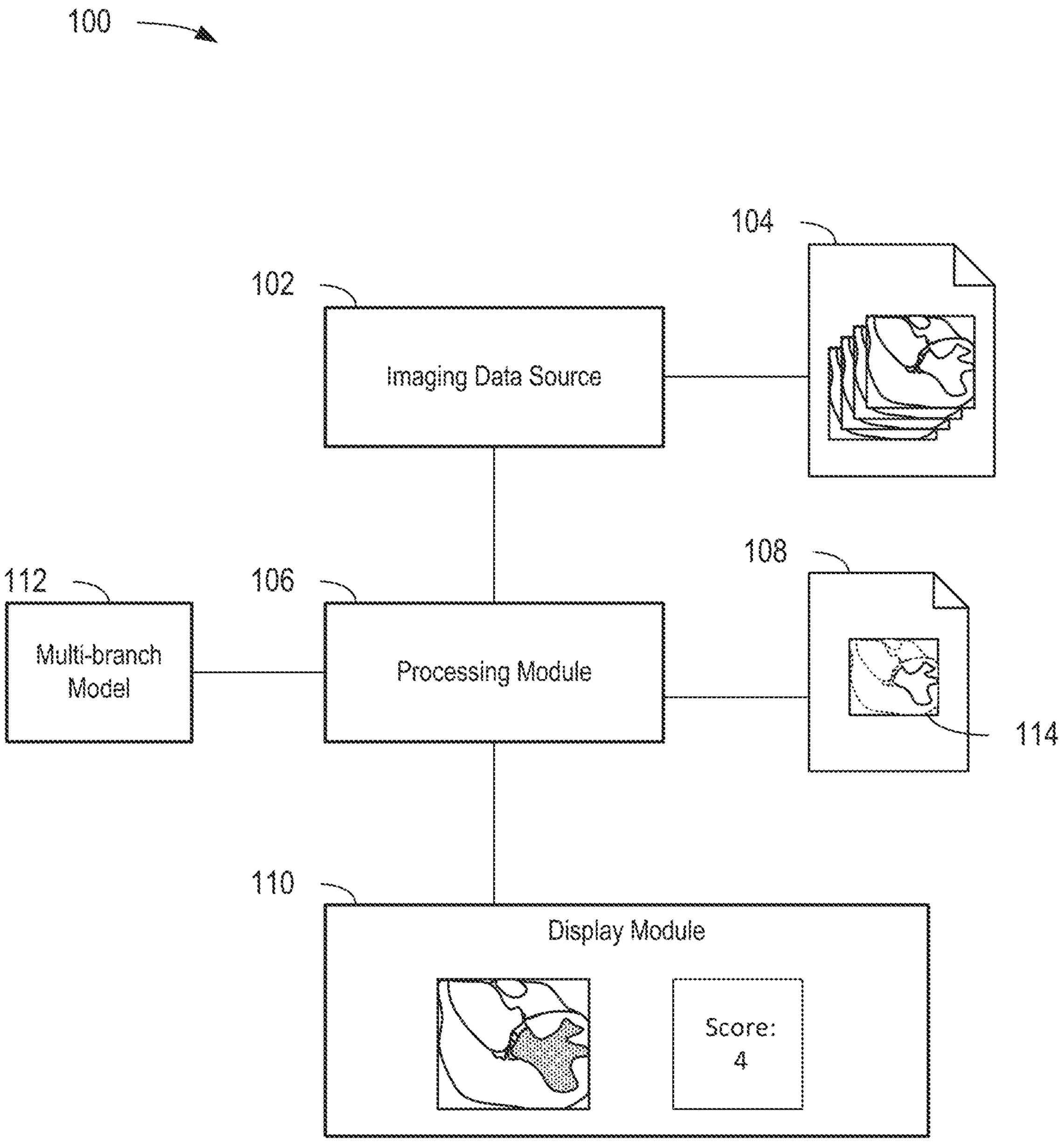
FIG. 1 is a schematic diagram depicting a computing environment for acquiring and processing imaging data, according to certain aspects of the present disclosure.

Certain aspects and features of the present disclosure relate to systems and method for segmenting and/or quantifying multi-slice medical imaging data by leveraging convolutional long short-term memory (LSTM) networks. The overall model architecture includes a multi-branch architecture that makes use of an attention branch and a main branch. The main branch includes a dense block followed by a segmentation head, and is configured to consider a single input slice of the imaging data. This main branch is able to segment larger and easier-to-classify targets. The attention branch, however, makes use of a sequential processor that includes a convolutional LSTM (ConvLSTM) followed by a segmentation head and an attention head. This attention branch is configured to process an input slice and additional adjacent slices. This attention branch is able to segment smaller and more difficult to classify targets.

In some cases, the use of multiple multi-branch models can facilitate segmentation of different elements of the medical images. In an example, coronary artery calcium (CAC) assessment can include a first model trained to segment calcium and a second model trained to segment the heart silhouette. The combination of these two models allowed for reduced model overcalling that would otherwise have occurred due to bone structures in these types of images. A heart mask from the second model could be applied to the target mask of the first model to reduce spurious bone overcalling.

As used herein, the term model can include an artificial intelligence model or network, such as a neural network, such as a recurrent neural network. Models can be trained through supervised or unsupervised learning. In some cases, a model can be trained through the use of supervised learning by leveraging annotated imaging data that had been manually annotated by expert readers (e.g., physicians).

The overall model architecture for a multi-branch model as disclosed herein is based on hierarchical multi-scale attention for semantic segmentation with the attention head looking through several adjacent slices above and below the current one to improve lesion recognition. The architecture is divided into two branches: a main segmentation branch and a attention branch. The main segmentation branch, consisting of a dense block followed by a segmentation head, extract larger and easy-to-classify lesions. The attention branch comprises a sequential processor: a ConvLSTM followed by a segmentation head and an attention head. The ConvLSTM block allows adjacent slices of a CT scan to be reviewed to ensure appropriate annotation. The attention head synergizes with the ConvLSTM to correct borderline misclassifications of the main segmentation branch. The segmentation head comprises three blocks: the first two blocks each including a 3×3 convolutional layer followed by a batch normalization layer and a LeakyRelu activation layer; and a final block that includes a 1×1 convolutional layer. The attention head is identical to the segmentation head in structure with the only difference is that the final block is followed by an additional Sigmoid layer.

In an example use case, a multi-branch model can be used to evaluate CT scans to identify lesions associated with particular conditions, such as Coronavirus disease 2019 (COVID-19). An example multi-branch model can be trained to quickly and accurately perform multi-class segmentation (e.g., segmentation of ground glass opacities and high opacities in the lung) of COVID-19 lesions from CT scans. In some cases, a multi-branch model as disclosed herein can be used to assist in the quantification of pneumonia burden from chest CT for prediction clinical deterioration or death in patients hospitalized with COVID-19.

COVID-19 is a global pandemic and public health crisis of catastrophic proportions, with over 213 million confirmed cases world-wide as of Aug. 25, 2021. While vaccines are now available, they are not 100% effective, new strains are emerging, and not all the population will be vaccinated. It is likely that annual vaccinations will be necessary and continuous monitoring for the disease will be needed. While the diagnosis of COVID-19 relies on a reverse transcription polymerase chain reaction (RT-PCR) test in respiratory tract specimens, computed tomography (CT) remains the central modality in disease staging. Conventional visual scoring of the COVID-19 pneumonia extent correlates with clinical disease severity, it requires proficiency in cardiothoracic imaging, and ignores lesion features such as volumes, density, or inhomogeneity. On the other hand, CT-derived quantitative lung measures are not part of the clinical routine due to prohibitively time-consuming manual segmentation of the lung lesions required for computation.

Deep learning, a class of artificial intelligence (AI), has shown to be very effective for automated object detection and image classification from a wide range of data. A variety of AI systems have been introduced to aid radiologists in the detection of lung involvement in COVID-19 with several presenting the potential to improve the performance of junior radiologists to the senior level. However, most medical segmentation networks consume a lot of memory in storing the intermediate features for skip connections. Considering the spatiotemporal nature of CT images, it has been determined that utilization of adjacent slices of input can improve performance in semantic segmentation tasks.

Convolutional long short-term memory (ConvLSTM) networks have the capability of preserving relevant features with simultaneous dismissing of irrelevant ones in the form of the feedback loop. As used herein, this capability translates into a memory-sparing strategy for the holistic analysis of the images. As disclosed in further detail herein, the ConvLSTM is used to facilitate rapid segmentation and accurate 3D quantification of the disease involvement of lung lesions in COVID-19 pneumonia from CT images, such as non-contrast CT images.

Further, the pneumonia burden can be automatically calculated from this automatic segmentation and quantification enabled by the multi-branch model disclosed herein. It has been found that this automatically determined pneumonia burden can be used to predict clinical deterioration or death in patients hospitalized with COVID-19.

In a first experimental example, a multi-branch model as disclosed herein was trained using a multi-center data of 167 patients. The model's self-attention block allowed the system of review adjacent slices of a CT scan to detect lung abnormalities and ensure appropriate annotations. In this first experimental example, since the dataset was small, 5-fold cross-validation was performed by training 5 independently trained identical models on non-overlapping subsets of 167 patients. In each of the 5 splits, the following data splits were used: (1) training dataset (115 or 116 cases) were used for training the model, (2) validation dataset (22 cases) were used to tuning the network, setting optimal hyper-parameters and verify no overfitting, (3) test dataset (29 or 30 cases) were used for evaluation; every patient in the entire dataset appears at least once in the test set. The final results were computed by concatenating the 5 test subset results summing up to 167 cases.

In this first experimental example, the mean dice score across 5 folds was 0.8776 with a standard deviation of 0.0095 across the folds. The low standard deviation between results from each fold indicate the models were trained equally well regardless of the training fold. The cumulative per-patient mean dice score (0.8775±0.075) for N=167 patients, after concatenation, was consistent with the results from each of the 5 folds. Excellent Spearman volume correlation (expert vs automatic) of 0.9448 ($p<0.0001$) and 0.8797 ($p<0.0001$) between ground-glass opacity and high opacity volumes, respectively, was obtained.

The model outperforms Unet2d ($p<0.05$) and Unet3d ($p<0.05$) in segmenting high opacities, has comparable performance with Unet2d in segmenting ground-glass opacities, and significantly outperforms Unet3d ($p<0.0001$) in segmenting ground-glass opacities. The model was approximately 1.3× faster than Unet2d and 7.1× faster than Unet3d on a graphics processing unit (GPU). The model also performs faster on a central processing unit (CPU): 2.5× and 3.4×, when compared to Unet2d and Unet3d, respectively. For same number of input slices, the model consumed 0.86× and 0.37× the memory consumed by Unet2d and Unet3d, respectively.

Thus, the proposed method provided rapid segmentation of COVID-19 lesions both on CPU and GPU with performance similar to that of an expert reader. The model can also be readily deployed on low-end clinical systems, since it requires less computational resources. The model also gives faster and more accurate results.

In a second experimental example, a post-hoc analysis was conducted of a prospective international registry of consecutive patients with laboratory-confirmed COVID-19 and baseline chest CT imaging, admitted to five centers between January 10 and Nov. 15, 2020. Total pneumonia burden was quantified using the multi-branch model disclosed herein, and semi-quantitative pneumonia severity scores were visually estimated. The primary outcome was clinical deterioration (e.g., intensive care unit admission, invasive mechanical ventilation, or vasopressor therapy) or in-hospital death.

The final population included 743 patients (mean age 65±17 years, 55% men), of whom 175 (23.5%) experienced clinical deterioration or death. The area under the receiver operating characteristic curve (AUC) for predicting the primary outcome was significantly higher for AI-assisted (e.g., using the multi-branch model disclosed herein) quantitative pneumonia burden (0.739) compared with the visual lobar severity score (0.711, $p<0.001$) and visual segmental severity score (0.722, $p=0.042$). AI-assisted pneumonia assessment exhibited lower performance when applied for calculation of the lobar severity score (AUC of 0.723, $p=0.021$). Time taken for AI-assisted quantification of pneumonia burden was substantially lower (38±10 seconds) compared to that of visual lobar (328±54 seconds, $p<0.001$) and segmental (698±147 sec, $p<0.001$) severity scores.

It has been determined that AI-assisted quantification of pneumonia burden from chest CT improves prediction of clinical deterioration in COVID-19 patients over semi-quantitative severity scores, and at a fraction of the analysis time.

In the second experimental example, the dataset used enrolled consecutive patients who underwent baseline chest CT and had a positive RT-PCR test result for SARS-CoV-2 during their index admission between January 10 and Nov. 15, 2020.

For patients with serial chest CT imaging, only the results of their initial scan were used. A rapid (results in minutes to hours) RT-PCR test was not available at any of the four institutions during this period, and the three European centers had resource constraints necessitating urgent patient triage. Hence, the primary indication for initial chest CT in all centers was a high clinical suspicion for COVID-19 in the setting of a high pretest probability or comorbidities associated with severe illness from COVID-19.

Chest CT scans were performed with different multi-slice CT systems: Aquilion ONE (Toshiba Medical Systems, Otawara, Japan); GE Revolution, GE Discovery CT750 HD, or LightSpeed VCT (GE Healthcare, Milwaukee, WI, USA); and Brilliance iCT (Philips Healthcare, Cleveland, OH, USA). Parameters used for scans without intravenous contrast included a peak x-ray tube voltage of 120 kV, automatic tube current modulation (300-500 mAs), and slice thickness of 0.625 to 1.25 mm. The protocol for contrast-enhanced included a peak x-ray tube voltage of 120 kV, automatic tube current modulation (500-650 mAs), and slice thickness of 0.625 to 1.0 mm. A total of 80-100 ml iodinated contrast material (Iomeron 400, Bracco Imaging SpA, Milan, Italy; or Ominpaque 350, GE Healthcare, United States) was injected intravenously at a rate of 5 ml/s and followed by 20-30 ml of saline chaser at flow are of 4-5 ml/s. Images were reconstructed using standard lung filters specific to each CT vendor. All scans were obtained in the supine position during inspiratory breath-hold.

Images were analyzed by two physicians with 3 and 8 years of experience in chest CT, and who were blinded to clinical data. A standard lung window (width of 1500 Hounsfield units [HU] and level of −400 HU) was used.

For AI-assisted pneumonia burden quantification, deep-learning research software (LungQuant v.1.0, Cedars-Sinai Medical Center, Los Angeles, CA, USA) was used. First ground glass opacities (GGO) and high-opacities (comprising consolidation and pleural effusion) were segmented using the ConvLSTM network. The acquired lesion masks were then edited when necessary to differentiate consolidation from pleural effusion with a semi-automated brush-like tool; the boundaries of which were delimited by a region-growing algorithm. Adaptive thresholds were used, defined by a fixed window around the attenuation of the pixel clicked by the operator. Lobe segmentation was computed using the pulmonary mask and a second deep learning model trained with the Lung Tissue Research Consortium dataset. The right lung was divided into upper, middle and lower lobes by the horizontal and oblique fissures, and the left lung was divided into upper and lower lobes by the oblique fissure. GGO was defined as hazy opacities that do not obscure the underlying bronchial or vascular structures, consolidation as opacification obscuring the underlying bronchial and vascular structures, and pleural effusion as a fluid collection in the pleural cavity. Chronic lung abnormalities such as emphysema or fibrosis were excluded from segmentation. Volumes of lesion components and total lesion volumes were automatically calculated by the software. Total pneumonia burden was calculated as total lesion volume/total lung volume×100%. AI calculations were performed on Nvidia Titan RTX 24 GB graphics processing unit.

For a lobar severity score, the extent of the parenchymal opacities involving GGO and consolidations were visually assessed for each of the 5 pulmonary lobes and scores ranging from 0 to 5 were attributed accordingly: 0 for no involvement; 1 for involvement between 0% and 5%; 2 for involvement between 5% and 25%; 3 for involvement between 25% and 50%, 4 for involvement between 50% and 75%; and 5 for involvement over 75%. The total lobar severity score ranged between 0 and 25 points.

For segmental severity score, the extent of the parenchymal opacities involving GGO and consolidations were visually assessed for each of the 20 pulmonary segments and scores ranging from 0 to 2 were attributed accordingly: 0 for no involvement; 1 for involvement between 0% and 50%; and 2 for involvement over 50%. The total segmental severity score ranged between 0 and 40 points.

All the cases were evaluated using each of the approaches. To limit the bias, images were first scored using a semi-quantitative approach. The minimal interval between the repeated evaluation of the case was 4 weeks. The time necessary to score the case using each of the three approaches was noted for all the patients.

In this second experimental example, a total of 743 patients with laboratory-confirmed COVID-19 who underwent chest CT during their admission were included. The primary outcome occurred in 175 patients: 93 were admitted to the ICU, 70 required mechanical ventilation, 64 required vasopressors, and 121 experienced in-hospital death. The remaining patients did not require critical care or had been discharged alive at the time of data collection. The patient data is depicted in Table 1.

TABLE 1

| | Clinical deterioration or death | | P |
|---|---|---|---|
| | Yes (n = 175) | No (n = 568) | value |
| **Lung Abnormality** | | | |
| Only ground-glass opacities | 18 (10.3) | 132 (23.2) | <0.001 |
| Only consolidation | 2 (1.1) | 1 (0.2) | 0.077 |
| Ground-glass opacities and consolidation | 144 (82.3) | 323 (56.9) | <0.001 |
| Pleural effusion | 42 (24.0) | 64 (11.3) | <0.001 |
| Emphysema | 19 (10.9) | 27 (4.8) | 0.003 |
| Fibrosis | 13 (7.4) | 19 (3.3) | 0.020 |
| None | 11 (6.3) | 112 (19.7) | <0.001 |
| **AI-assisted burden (%)** | | | |
| Total | 16.0 (4.5-39.3) | 3.7 (0.3-10.3) | <0.001 |
| Ground-glass opacities | 12.1 (3.5-34.6) | 3.3 (0.2-9.0) | <0.001 |
| Consolidation | 0.7 (0.1-3.7) | 0.2 (0.0-0.4) | <0.001 |
| Pleural effusion | 0.0 (0.0-0.7) | 0.0 (0.0-0.0) | <0.001 |
| Lobar severity score | 10 (6-15) | 6 (3-9) | <0.001 |
| Segmental severity score | 9 (4-15) | 18 (10-27) | <0.001 |

In this second experimental example, agreement between AI-assisted and visual analysis of lobar involvement was evaluated with a weighted kappa statistic. The degree of agreement was considered excellent for kappa >0.80; substantial for kappa 0.61-0.80; moderate for kappa 0.41-0.60; fair for kappa 0.21-0.40; and poor for kappa≤0.20.

Patients with deterioration or death had a higher total burden of COVID-19 pneumonia compared to patients that did not experience deterioration or death (16.0% [interquartile range (IQR), 4.5-39.3%] vs 3.7% [IQR, 0.3-10.3%], p<0.001). Similarly, patients who deteriorated or died were characterized with a higher visual lobar (10 [IQR, 6-15] vs 6 [IQR, 3-9], p<0.001) as well as segmental (18 [IQR, 10-27] vs 9 [IQR, 4-15], p<0.001) severity scores compared to patients who did not require critical care or were discharged alive. Time required for calculation of AI-assisted pneumonia burden (38±10 sec) was significantly lower compared to both visual lobar (328±54 sec, p<0.001) and segmental (698±147 sec, p<0.001).

The frequency of clinical deterioration in each of the quartiles for respective scoring systems are presented in Table 2. For AI-assisted pneumonia burden, the odds of clinical deterioration were: 8.46 (95% CI: 4.85-14.73) for quartile 4 versus quartile 1, 5.70 (95% CI: 3.46-9.40) for quartile 4 versus quartile 2, and 3.80 (95% CI: 2.40-6.00) for quartile 4 versus 3. For visual lobar severity score, the odds of clinical deterioration were: 6.50 (95% CI: 3.86-10.93) for quartile 4 versus quartile 1, 5.90 (95% CI: 3.52-9.88) for quartile 4 versus quartile 2, and 3.40 (95% CI: 2.16-5.34) for quartile 4 versus 3. For visual segmental severity score, the odds of clinical deterioration were: 7.27 (95% CI: 4.31-12.26) for quartile 4 versus quartile 1, 5.74 (95% CI: 3.54-9.31) for quartile 4 versus quartile 2, and 3.56 (95% CI: 2.27-5.58) for quartile 4 versus 3.

TABLE 2

| | Quartile 1 | Quartile 2 | Quartile 3 | Quartile 4 | P Value |
|---|---|---|---|---|---|
| Range of AI-assisted pneumonia burden | (0-0.6%) | <0.6-5.1%) | <5.1%-15.4%) | <15.4%-100%) | |
| Range of clinical deterioration in AI-assisted pneumonia burden quartiles | 10.2% (19/185) | 14.5% (27/186) | 20.3% (38/187) | 49.2% (91/185 | <0.001 |
| Range of lobar severity score | 0-3 | 4-6 | 7/10 | 11-25 | |
| Range of clinical deterioration in lobar severity score quartiles | 12.5% (24/191) | 13.7% (25/183) | 21.5% (42/195) | 48.2% (84-174) | <0.001 |

TABLE 2-continued

| | Quartile 1 | Quartile 2 | Quartile 3 | Quartile 4 | P Value |
|---|---|---|---|---|---|
| Range of segmental severity score | 0-5 | 6-11 | 12-17 | 18-40 | |
| Range of clinical deterioration in segmental severity score quartiles | 11.8% (23/194) | 14.5% (30/206 | 19.8% (32/161) | 49.5% (90/182) | <0.001 |

Serum biomarkers were more strongly correlated with AI-assisted pneumonia burden than the semi-quantitative severity scores. The pneumonia scoring systems had a moderate correlation with lactate dehydrogenase and C-reactive protein levels, and weak correlations with lymphocytes, ferritin, D-dimer, and creatine kinase-MB.

In this second experimental example, the accuracy of an AI-assisted pneumonia burden was compared with conventional pneumonia severity scores derived from chest CT for predicting clinical deterioration were compared. It was demonstrated that quantitative pneumonia burden determined with an AI achieved higher predictability of clinical deterioration to the semi-quantitative visual scoring systems and significantly reduced the time required for pneumonia evaluation from chest CT.

The chest CT is currently indicated in COVID-19 patients with moderate or severe respiratory symptoms and high pretest probability of infection; or any other clinical scenario requiring rapid triage. To facilitate the standardized evaluation of pulmonary involvement from CT, several different severity scores have been proposed. The semi-quantitative scoring systems—developed originally to describe the idiopathic pulmonary fibrosis and adapted later for CT examination of patients recovering from severe acute respiratory syndrome—have been recently shown to associate with the clinical disease severity and adverse outcomes in COVID-19 patients. Although visual analysis of lung involvement is the only available approach to many of the institutions, its application remains limited to the staff proficient at cardiothoracic imaging. Moreover, the reproducibility of the measurements may be dependent on the experience of the individual reader and the scoring was showed to differ significantly between radiologists and clinicians.

Alternatively, the extent of pneumonia can be characterized using quantitative measurements, which require segmentation of both lungs and parenchymal lesions. While the manual approach is prohibitively time-consuming and could not be employed in a routine clinical setting, the application of deep learning—a class of AI—has been demonstrated as the robust tool generating results with an accuracy similar to the experts.

In spite of the central role of CT in prognostication, a paucity of data remains on the incremental value of AI-assisted pneumonia burden quantification in comparison to semi-quantitative scores for prediction of clinical deterioration in COVID-19 patients admitted to the hospital. The superior performance of the AI in comparison to the expert reader was previously found by the Gieraerts et al. in a single-center study involving 250 COVID-19 patients, although they did not report a significant difference in prognostic accuracy between quantitative pneumonia burden (AUC of 0.878) and semi-quantitative (AUC of 0.888) measured with an AI. This could be associated with a relatively small number of events (n=39) limiting their statistical power since such a high accuracy could not be achieved even by the model combining multiple quantitative lesion features in a landmark study by Zhang et al (AUC of 0.848). In a three-fold larger study involving real-life data from five continents we report improved prognostication with AI-assisted pneumonia burden as compared to visually estimated, but also AI-derived semi-quantitative severity scores. Although the agreement between AI and visual estimation of pulmonary involvement in COVID-19 was excellent, the reclassification table for the comparison of pulmonary lobes evaluation showed the tendency of visual scoring to overestimate the disease burden in severe cases. While the NRI remained unaffected, the results confirm previously observed bias in the visual estimation of lung abnormalities, which may negatively affect the overall performance of the scoring. Further, observed decrease in the prognostic value of the AI-assisted measurements following the translation of pneumonia burden into the lobar severity score, suggests semi-quantitative scales being naturally limited by the categorization of the continuous data.

The results of the second experimental example also showed the correlation of pneumonia severity scores with blood biomarkers related to systemic inflammation, thus underscoring the importance of lung involvement as the key parameter in the overall prognostic implications. The strongest correlations were found for the levels of C-reactive protein and lactate dehydrogenase. The first indicates the association of lung injury with acute inflammation, and the latter—being the marker of liver function—may suggest its role in the pathogenesis of multi-organ failure. Although the relation between pulmonary inflammation in COVID-19 and the pathogenetic sequelae resulting in clinical deterioration is not fully understood, this may mechanistically explain the prognostic value of chest CT imaging.

Quantification of the parenchymal opacification on chest CT might be applied for image-based triage to optimize the distribution of resources during the pandemic. The quantitative pneumonia burden outperforms semi-quantitative severity scores for prediction of clinical deterioration in COVID-19 patients. Also, the application of AI as disclosed herein can substantially lessen the workload in the radiology departments. The deep-learning algorithm disclosed herein requires little to no interaction, facilitating, therefore, the rapid risk assessment by the clinicians with limited experience in cardiothoracic imaging.

This second experimental example shows that AI-assisted pneumonia burden improves the prediction of clinical deterioration in COVID-19 patients as compared to semi-quantitative severity scores and may significantly expedite CT-based triage in the emergency environment.

In a different example use case, a dual multi-branch model (e.g., two multi-branch models working together) can be used to evaluate CT attenuation correction (CTAC) scans to identify coronary artery calcium lesions. A first model can be trained to identify calcium in the CT images, while the second model can be trained to identify the boarders of coronary tissue. By leveraging the outputs of both models, a quantitative analysis of coronary artery calcium can be obtained. This quantitative analysis can be used to track the progression of coronary artery calcification and can be used to provide a prognosis for a given patient.

Positron emission tomography (PET) myocardial perfusion imaging (MPI) is well established in the prognostic assessment of patients with known and suspected coronary artery disease (CAD); however, it does not measure coronary atherosclerosis. The extent of coronary artery calcium, a measure of atherosclerotic burden, provides powerful risk stratification and influences preventive therapies and lifestyle changes. Prior studies have shown that CAC provides incremental prognostic information to single photon emission tomography (SPECT) MPI and is associated with beneficial changes in patient management.

Most current PET systems are offered with a hybrid configuration including a CT scanner. For PET/CT, a low-dose, ungated CT attenuation correction scan is always obtained. Hybrid SPECT/CT scanners are becoming also more widely utilized for MPI, which results in CTAC scans being frequently used for SPECT studies as well. As disclosed in further detail herein, CAC information can be extracted from CTAC scans to provide supplementary data and allow for more informed decision making after MPI. Under existing technology and procedures, subjective visual assessment of CAC is recommended, and quantitative CAC scoring in CTAC scans is currently not performed. Therefore, the utility of these ubiquitous scans is not currently fully exploited clinically.

Automated and rapid CAC quantification from CTAC scans using a novel deep learning approach that integrates the data from adjacent CT slices is disclosed. The prognostic value of CAC scores obtained from deep learning (DL) segmentations of CTAC scans (DL-CTAC scores) in the prediction of major adverse cardiac events (MACE) and compared DL-CTAC scores with clinical CAC scores obtained from standard CAC scans is evaluated.

In a third experimental example, 6944 CTAC and 1643 standard CT scans were used to train a dual multi-branch model as disclosed herein. The model was 13 tested in 4331 patients from an external cohort undergoing PET/CT, including same-day standard ECG-gated CAC scans available in 2737 patients. Major adverse cardiac events (MACE) follow-up was available in all patients. The MACE risk stratification in 4 CAC score categories (0; 1-100; 101-400; >400) were analyzed and CAC scores derived from ECG-gated scans by expert observers were compared with scores derived by using the dual multi-branch model disclosed herein as applied to CTAC scans. As used herein, the use of a dual multi-branch model as disclosed herein can be referred to as a deep learning (DL) technique. Thus, DL scoring is intended to include scoring achieved using the dual multi-branch model. Further, DL-CTAC scores are intended to include scoring achieved using the dual multi-branch model as applied to CTAC imaging data.

In the external test set, 57% of patients were male, with mean age of 71±12, and median follow-up of 4.3 years. DL scoring was performed fully automatically in less than 6 seconds per scan. For DL-CTAC scores, there was a step-wise increase in hazard ratio (HR) for 23 MACE across the prespecified CAC score categories (HR up to 3.2, $p<0.001$). Net reclassification improvement of standard CAC scores over DL-CTAC scores was non-significant (−0.02, 95% confidence interval: −0.11, 0.07). The negative predictive values for MACE of standard (85%) and DL-CTAC score (83%) were similar ($p=0.19$).

Thus, the third experimental example showed that CAC scores obtained automatically by DL from PET CTAC scans predict cardiovascular risk similarly to CAC scores derived by experienced operators from dedicated ECG-gated CAC scans. DL-CTAC scores can be obtained instantly with no changes to PET/CT scanning protocols, with no need for additional radiation associated with the dedicated CAC scan.

Scoring CTAC scans with the proposed deep learning model adds critical and independent prognostic information without additional costs and radiation needed for a dedicated CAC CT. The model(s) disclosed herein detect the heart automatically and can work with any low-dose CTAC scan that includes the chest region, allowing routine automatic CAC scoring in CTAC scans for any PET/CT scan. Given the lack of reimbursement of dedicated CAC scanning as a part of PET/CT workflow, use of the model(s) disclosed herein could offer a cost-effective solution that allows for obtaining additional CAC information from all PET/CT studies.

In this third experimental example, two separate cohorts (each comprising 10% of the total number of available scans, n=956) were sampled out of the initial training cohort with equal number of cases in each CAC score category. One of those cohorts was held out as a validation set during training, and the model parameters were optimized for this set, while the second was held out for internal testing. Training, internal validation and internal testing cases were annotated on-site by two readers with at least 5 years of experience in CAC scoring using dedicated quantitative software (Cardiac Suite, Cedars Sinai). CAC scores were calculated according to the standard clinical algorithm. All cases were categorized based on the CAC score (category 1: CAC score=0, category 2: CAC score 1-100, category 3: CAC score 101-400, category 4: CAC score >400). In a set of randomly selected 20 patients the readers' scoring time was recorded.

Clinical CAC scores that were acquired from dedicated CAC scans at the time of reporting were used. The clinical scores were calculated using standard dedicated workstation with quantitative software (ScImage Inc., Los Altos, CA, USA and Cardiac Suite, Cedars-Sinai, Los Angeles, CA, USA), by an experienced technologist and reviewed by the reporting cardiologist during the clinical reporting.

The overall model used made use of a ConvLSTM model, to automatically segment CAC from CTAC maps. Unlike previously published approaches to CAC scoring using DL that relied on analyzing one CT slice at a time, ConvLSTM efficiently aggregates information from adjacent slices, similar to expert scrolling through the images, to automatically identify calcified lesions. A separate secondary ConvLSTM model was trained to define the exact heart boundaries on a subset of the training data with expert-annotated heart contours. This secondary model was used to remove calcium lesions that were detected outside the heart.

Internal testing was performed on a held-out data set with no overlap with the training or internal validation cases. In this set the agreement in CAC score categories between scores coming from expert readers' annotations and from DL segmentations was assessed.

The trained model was tested in the data from the separate center cohort. All stress CTAC scans underwent automatic segmentation by the model and the DL-CTAC scores were calculated based on the segmentation masks. When stress CTAC scan was not available, rest CTAC scan was used instead. No data from this cohort was used to train the network.

To allow for comparison with standard calcium scoring method, the DL-CTAC scores were separately evaluated on a subset of the external testing cohort with available clinical CAC scans acquired on the same date as PET/CT. The relation of CAC score category based on DL-CTAC score as well as based on expert readers annotations on dedicated CAC scans with the occurrence of any MACE event was studied The external testing cohort was followed for MACE (defined as all-cause mortality, late revascularization [percutaneous coronary intervention or coronary artery bypass grafting] that occurred later than 90 days from scan, admission for unstable angina, or myocardial infarction). Follow-up for all-cause mortality was obtained using internal hospital records as well as the Social Security Death Index (SSDI), National Death Index (NDI), and California Non-comprehensive Death File until December 2020. Information regarding myocardial infarction, unstable angina, and revascularization were collected from hospital records and verified by site physicians according to standard criteria.

In this third experimental example, the development cohort consisted of training and validation sets and included a diverse patient population undergoing SPECT/CT at 3 different centers with 6944 low-dose CTAC scans and 1643 ECG-gated CAC scans. It took up to 8 minutes to score a CTAC scan by the experienced reader (median 105 seconds, IQR 80, 188). The end-to-end DL processing time was less than 6 seconds.

The DL predictions were first evaluated against annotations by expert readers in the internal held-out set of 956 cases that included 212 CAC scans and 744 CTAC scans. The model was able to successfully score scans with various slice thickness (ranging from 2.5 to 5 mm). Agreement in CAC score categories with those based on expert readers annotations was very good across the variety of acquisition protocols (linearly weighted Cohens Kappa 0.83 [95% CI 0.8, 0.85], n=956).

Stress scans were used for DL-CTAC scoring wherever available, and in the remaining 19 cases, rest scans were used. A typical radiation dose associated with a CTAC scan was 0.2-0.3 mSv, while a typical radiation dose for a dedicated CAC scan acquired at the time of PET MPI was between 1 and 3 mSv.

This third experimental example also shows that similar risk stratification of DL-CTAC occurs despite the full automation of DL-CTAC and the difference in the image quality between DL-CTAC and standard CAC scans. Similar results in the subset of patients with no history of prior CAD (n=2502) with available same-day standard CAC scans occurred.

For the higher CAC categories, significant differences in MACE rates were observed for both standard score and DL-CTAC score in all categories of CAC score >0. Univariable Cox revealed incrementally increasing HR in each of CAC score categories with significantly higher MACE risk in the low (CAC score 1-100) moderate (CAC score 101-400) and high (CAC score >400) categories regardless of whether prior CAD cases were excluded or not.

After adjusting for myocardial ischemia and flow reserve all CAC score categories, both by DL-CTAC and clinical CAC scores were associated in increasing HR of MACE, but in the low CAC score category (CAC 1-100) this result was not significant for both DL-CTAC and clinical scores. After excluding patients with prior CAD, all CAC score categories, both by DL-CTAC and clinical CAC scores were associated with significantly higher risk of future MACE independently from myocardial perfusion and flow. Negative predictive values (NPV) of clinical CAC=0 vs. DL-CTAC CAC=0 were not significantly different at 85% and 83%, respectively (p=0.19). In patients with no history of CAD the NPV of clinical CAC=0 vs. DL-CTAC CAC=0 were 86% and 84%, respectively (p=0.15).

The overall NRI showed no improvement by clinical CAC scores as compared to DL-CTAC scores (NRI–0.017, 95% CI–0.11, 0.07). The event and non-event NRI were 0.1 (95% CI–0.02-0.16) and –0.11 (95% CI–0.15, –0.07), respectively. Similarly, after excluding cases with prior CAD, NRI was –0.005 (95% CI–0.11, 0.09), and the event and non-event NRI were 0.12 (95% CI 0.05, 0.19) and –0.12 (95% CI–0.17, –0.08), respectively. The model disclosed herein can successfully distinguish CAC from non-coronary opacities like aortic or mitral calcifications.

Calcium score categories obtained using the deep learning framework from CTAC maps exhibited good agreement with standard CAC scores quantitatively assessed on gated CAC scans. The linearly weighted Cohen's Kappa was 0.62 (95% CI 0.6, 0.64).

This third experimental example is the first study to show the prognostic value of CAC scores obtained fully automatically and rapidly by novel deep learning approach from low-dose ungated CTAC maps in a large PET/CT patient cohort. Importantly, NPV for MACE based on CAC scores obtained from standard-dose gated CT scans did not differ significantly and standard scores did not provide significant reclassification improvement over the fully automatic DL-CTAC scores. Furthermore, the associations of these scores with increased MACE were independent of ischemia or myocardial flow reserve measures. After adjusting for standard PET variables, the DL-CTAC scores provided incremental prognostic information in multivariable analysis, highlighting the clinical relevance of performing CAC imaging as part of cardiac PET/CT acquisitions.

Consistent data has shown the strong prognostic value of CAC assessment in asymptomatic individuals. Assessment of CAC during SPECT MPI scans has been shown to add to perfusion in risk assessment and improve assessment of pretest likelihood of CAD, thereby contributing to diagnostic accuracy and leading to changes in preventive medications and beneficial changes in patient's adherence to medication recommendations. In a substantial proportion of centers performing PET MPI, separate ECG-gated CAC scans are not performed, due to added cost and radiation, as well as lack of reimbursement. The ability of CAC assessments to be made from CTAC scans, obtained with all PET/CT procedures, provides the opportunity to take advantage of the known benefits of additional CAC information, in a wide group of patients with no modifications to study protocols.

CAC scoring in low-dose ungated scans represents a challenge for the human reader, as the high noise levels, partial volume effect, and motion artifacts affect the appearance of CAC lesions. For this reason, experienced expert readers cannot achieve a perfect agreement in scores between standard ECG-gated CAC scans and non-gated CT, with frequent false-negative scores being identified as a major issue. Due to the cumbersome, time-consuming manual annotation and high observer variability in low-quality scans, quantitative CAC scoring is not routinely performed in CTAC maps. In contrast, the deep learning approach disclosed hereon can allow routine and automatic quantification of these scans within just few seconds per scan on any standard workstation regardless of the complexity of the case.

Additionally, aside from MPI studies, certain aspects of the present disclosure can be used also for non-cardiac PET. In the US alone, there are over 2 million PET scans performed annually. Indeed, a very recent study has shown, that CAC scores acquired automatically for all patients undergoing radiotherapy for breast cancer provide valuable prognostic information. The deep learning approach disclosed herein could potentially provide complementary stratification of cardiac risk for millions of patients undergoing PET for oncological purposes. In this context, the fact that the risk stratification in all-comers was similar to that in the population without prior CAD, is an additional advantage.

CAC scores obtained automatically in few seconds by deep learning from low-dose ungated CTAC scans predict MACE similarly to standard clinical CAC scoring by expert readers from dedicated ECG-gated CT scans. DL-CTAC scores can be obtained instantly for all patients undergoing PET/CT with no modifications in study protocol. The addition of routine CAC scoring with CTAC scans could lead to improved diagnosis, risk stratification and disease management and could influence lifestyle recommendations.

In an example use case, a multi-branch model as disclosed herein can be used to evaluate coronary computed tomography angiography (CCTA) imaging data to assess plaque, as well as coronary artery disease burden and prognosis. A model can be trained to identify plaque in the CCTA images, which can then be used to calculate plaque area or volume, disease burden, and estimated prognosis. In some cases, to enforce structural consistency, coronary segmentation can be performed in a multi-task approach for: 1) the vessel wall; and 2) the lumen and plaque components. In some cases, coronary artery centerline extraction can be a pre-processing step prior to feeding the imaging data to the model.

Coronary computed tomography angiography (CCTA) is a robust first line test for the evaluation of coronary artery stenosis severity. When integrated into clinical decision making, CCTA guides the use of preventative therapies, improves event-free survival, and enhances the diagnostic yield of invasive coronary angiography (ICA). Beyond assessment of stenosis severity, CCTA also enables non-invasive whole heart quantification of atherosclerosis. Advancements in CT technology now allow for semi-automated measurements of coronary atherosclerotic plaque with high accuracy when compared to intravascular ultrasound (IVUS). CCTA-derived plaque volumes have demonstrated prognostic value for lesion-specific and patient-level risk of acute coronary syndrome (ACS). More recently, low-attenuation plaque burden quantified from CCTA was shown to be the strongest independent predictor of myocardial infarction (MI) in patients from the landmark SCOT-HEART (Scottish Computed Tomography of the Heart) trial. However, semi-automated plaque quantification is time-consuming and requires a high level of human expertise. As disclosed herein, AI algorithms can be applied to CCTA to improve the efficiency and accuracy of image analysis, demonstrating high performance when compared to expert readers. Deep learning is a form of AI which uses artificial neural networks to generate automated predictions directly from imaging data. Certain techniques and features of the present disclosure relate to a novel DL system for CCTA-derived measures of plaque volume and stenosis severity; and to evaluate the diagnostic performance of DL against that of expert readers, ICA, and IVUS. The predictive value of DL-based atherosclerotic quantification for risk of future MI in a subanalysis of the SCOT-HEART trial was also assessed.

In a fourth experimental example, an international multicentre study of patients undergoing CCTA at 11 sites was performed. A novel DL convolutional neural network, such as disclosed herein, was trained to segment coronary plaque in 921 patients (5,045 lesions). The DL network was then applied to an independent test set, which included an external validation cohort of 175 patients (1,081 lesions) as well 50 patients (84 lesions) assessed by IVUS within one month of CCTA. Thereafter, the prognostic value of DL-based plaque measurements was evaluated for fatal or nonfatal MI in 1,611 patients from the prospective SCOT-HEART trial.

In the overall test set, there was excellent agreement between DL and expert reader measurements of total plaque volume (intraclass correlation coefficient [ICC] 0.964) and percent diameter stenosis (ICC 0.879; both $p<0.0001$). When compared with IVUS, there was excellent agreement for DL total plaque volume (ICC 0.949) and minimal luminal area (ICC 0.904). The average per-patient DL plaque analysis time was 5.7 seconds versus 25-30 minutes taken by experts. Over a median follow-up of 4.7 years, MI occurred in 41 patients (2.5%) from the SCOT-HEART trial. DL-based total plaque volume ≥238.5 mm3 was associated with an increased risk of MI (HR 5.36, 95% CI 1.70-16.86; p=0.0042) after adjustment for the presence of DL-based obstructive stenosis (HR 2.49, 95% CI 1·Jul. 5, 1950; p=0.0089) and the cardiovascular risk score (HR 1.01, 95% CI 0.99-1.04; p=0.35).

Certain aspects and features of the present disclosure can automate the most complex steps in the plaque analysis workflow—vessel wall contouring, setting adaptive HU thresholds for the various plaque components, and differentiating coronary from non-coronary structures—to provide a graphical three-dimensional output of plaque segmentation and a comprehensive list of quantitative parameters. Using a standard desktop computer, this approach showed excellent agreement with expert reader measurements and the gold standard of IVUS, at a fraction of the analysis time taken by experts (3.8 versus 25-30 minutes).

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

FIG. 1 is a schematic diagram depicting a computing environment 100 for acquiring and processing imaging data, according to certain aspects of the present disclosure. The computing environment 100 can include an imaging data source 102, a processing module 106, and a display module 110. The imaging data source 102, processing module 106, and display module 110 can be incorporated into a single housing or split into any number of housings, whether physically coupled together or not. The imaging data source 102, processing module 106, and display module 110 can be located in a shared location (e.g., a room, suite, facility, or building) or in different locations. In some cases, the imaging data source 102 can be located in a first location and the processing module 106 and display module 110 can be located in a separate, second location. For example, the imaging data source 102 can be a CT scanner located in a medical imaging facility and the processing module 106 and display module 110 can be a physician's computer workstation (e.g., the processor and display of the computer workstation) in the physician's office that is located in a separate facility, separate city, or even separate county as the medical imaging facility. In another example, the imaging data source 102 can be a remote medical imaging server, such as a Digital Imaging and Communications in Medicine (DICOM) server located remotely from the processing module 106 and display module 110. Other combinations can occur.

The imaging data source 102 can be any suitable source for imaging data, such as a server storing already generated imaging data 104 or an imaging device for initially generating imaging data 104 (e.g., a CT scanner). According to certain aspects and features of the present disclosure, the imaging data source 102 is a CT scanner that acquires imaging data 104 in the form of a series of ordered, CT images. In the example of a CT scanner, the CT scanner can include an emitter (e.g., an X-ray emitter), a detector (e.g., an X-ray detector) and any other components usable to generate and/or transmit the imaging data 104 from the data acquired by the detector. Such a CT scanner can be used to detect radiation (e.g., X-rays) passing through a patient's tissue (e.g., cardiac tissue). As the radiation passes through different types of tissue, it is attenuated differently. The use of contrast can further enable the contrast material (e.g., which may be flowing in a vein or artery) to be distinguished from surrounding tissue.

The imaging data source 102 can be communicatively coupled to the processing module 106 and/or the display module 110 via any suitable technique, such as wired or wireless connections, including direct connections or networked connections. In some cases, imaging data source 102 can be coupled to processing module 106 via a network, such as a local area network, a wide area network, a cloud network, or the Internet. In some cases, data transfer between the imaging data source 102 and the processing module 106 can occur via removable physical media, such as compact disks or flash drives.

The imaging data 104 can be stored and/or transferred in any suitable format. In some cases, the imaging data 104 can be stored and/or displayed as two-dimensional or three-dimensional images. In some cases, the imaging data 104 can be stored as a collection of data points or voxels. The imaging data 104 can include a series of ordered, image slices.

The processing module 106 can be any suitable computing device for processing the imaging data 104 as disclosed herein. The processing module 106 can access a multi-branch model 112 and receive the imaging data 104. The processing module 106 can process the imaging data 104 by applying it to the multi-branch model 112 to generate output data 108. The multi-branch model 112 can be stored in any suitable location, such as local or remote memory accessible to processing module 106.

The output data 108 can include one or more target masks 114. Each target mask 114 can identify any regions of an image (e.g., of a correlated image slice of the imaging data 104) that are determined to be target regions. The output data 108 is thus usable to segment the imaging data 104 into target regions and not target regions. In other words, the output data 108 can include segmentation data indicative of the boundaries of one or more targets present in the imaging data 104. In some cases, the output data 108 indicates such boundaries and/or otherwise indicates the target regions by identifying which pixels of an image slice (or voxels) are identified as being the target and/or which pixels of an image slice (or voxels) are identified as not being the target.

The particular targets segmented in the output data 108 depend on the particular multi-branch model 112 accessed. For example, a multi-branch model 112 trained to identify certain lesions in the pleural space of a patient will result in output data 108 that segments the imaging data 104 into regions that are qualified as lesions and regions that are not qualified as lesions. In some cases, a particular multi-branch model 112 can be selected from a set of possible multi-branch models 112, such as based on a user selection or based on additional information associated with the imaging data 104 (e.g., metadata).

In some cases, the output data 108 can further include the imaging data 104 (e.g., a two-dimensional or three-dimensional image). For example, in some cases, the output data 108 can be an annotated version of the imaging data 104, with annotations identifying the regions identified as targets. Such an annotated version can be created by applying the target mask(s) 114 to the imaging data 104.

In some cases, the output data 108 can further include a quantitative score that is derived using the one or more target masks 114. The quantitative score can be a number indicating a measurement and/or assessment associated with the target of the segmentation. For example, when the multi-branch model 112 is trained to segment imaging data of a pleural cavity into regions that are and are not lesions, the quantitative score can be a total volume of the identified lesions. In the same example, another quantitative score can be a risk level (e.g., an integer from zero to five indicative of a risk of a particular condition or prognosis of a particular outcome) that is calculated from the identified lesions (e.g., from their placement and/or from the percentage of volume of the entire pleural cavity being occupied by the lesions).

The output data 108 can include additional information generated using the target mask(s) 114.

In some cases, the processing module 106 can include an input device, such as a computer mouse, keyboard, touchscreen, or the like. The input device can allow a user (e.g., a physician or other medical professional) to interact with the imaging data 104 and control generation of the output data 108. In some cases, input from a user may be used to constrain portions of the input imaging data 104 that will be used to generate the output data 108. In some cases, the processing module 106 can include the display module 110 for displaying imaging data 104 and/or output data 108. In some cases, the display module 110 is used in conjunction with or includes an input device.

The output data 108, once generated, can be presented on the display module 110 or otherwise presented to a user or patient. The output data 108 can be presented as an image (e.g., a slice of the imaging data 104 with a target region, as identified by the target mask 114, highlighted), a number (e.g., a quantitative score, such as a risk score or a measurement), or in any other suitable fashion. In some cases, the display module 110 can present a suggested diagnosis as determined using the target mask(s) 114.

In some cases, instead of or in addition to displaying the output data 108, the output data 108 can be leveraged to perform further functions. For example, the output data 108 can be used as input data for a subsequent process used to generate a diagnosis.

While depicted with certain elements and modules, in some cases computing environment 100 may not include one or more of those elements and modules, and/or may include additional elements and/or modules.

Figure 2:
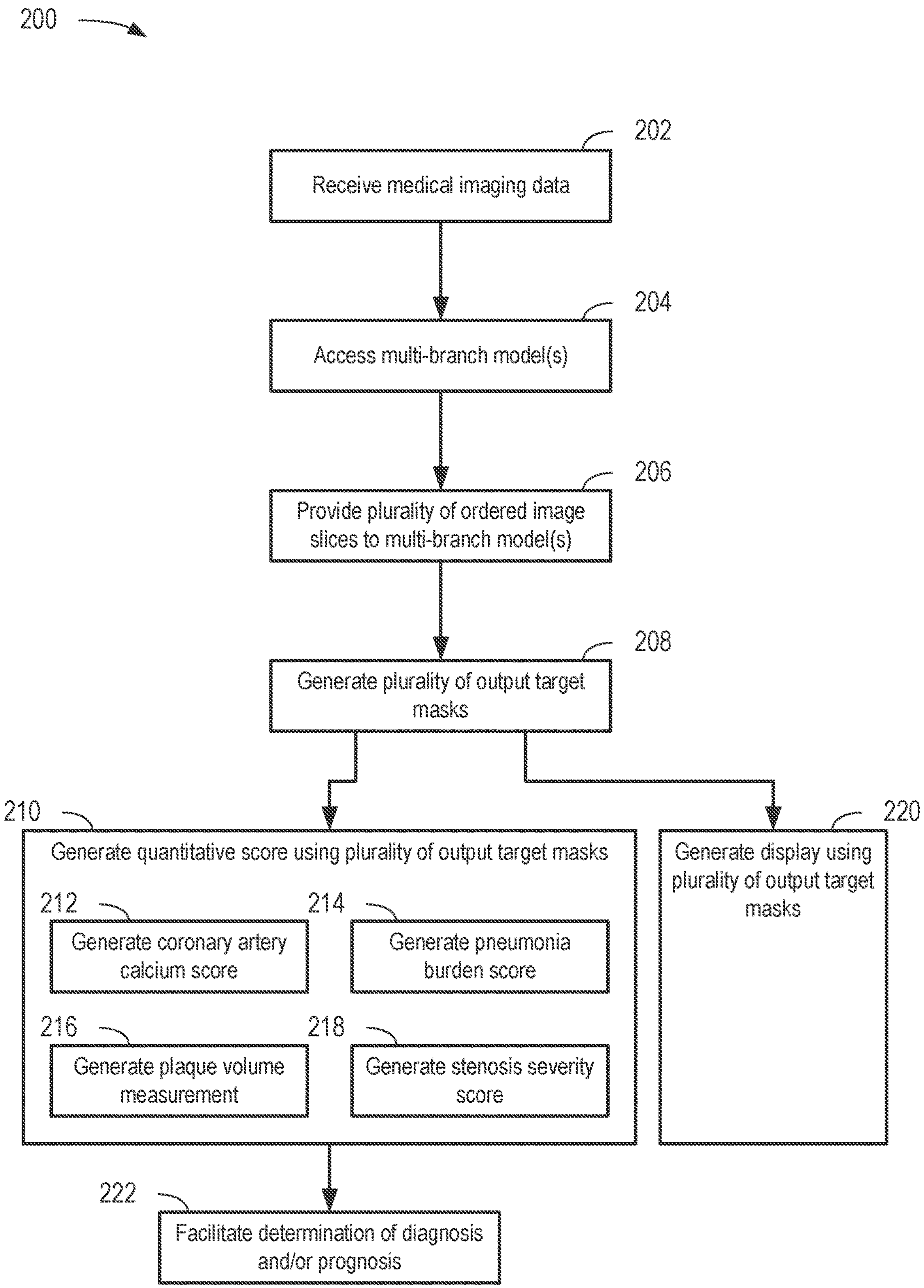
FIG. 2 is a flowchart depicting a process for segmenting imaging data, according to certain aspects of the present disclosure.

FIG. 2 is a flowchart depicting a process 200 for segmenting imaging data, according to certain aspects of the present disclosure. Process 200 can be performed by any suitable computing device, such as processing module 106 of FIG. 1.

At block 202, medical imaging data is received. Receiving medical imaging data can include receiving data representative of a set of image slices, such as two-dimensional image slices. The set of image slices can be ordered such that for each image slice, there exists at least one adjacent image slice. Generally, each subsequent image slice is acquired at a distance from the immediately previous image slice such that multiple image slices can be used together to reconstruct a three-dimensional volume. When used herein, the term image slice is intended to include a collection of data representative of an image slice. For example, in an image dataset containing a plurality of voxels, an image slice can be the collection of voxels that share a common Z-axis value (or alternatively, a common Y-axis or X-axis value). When arranged in place, this collection of voxels can be used to generate a two-dimensional image of a "slice" at a particular Z-location of the subject being imaged.

At block 204, one or more multi-branch models are accessed. In some cases, a single multi-branch model is accessed and used for process 200. In some cases, however, two or more multi-branch models can be accessed and used. Each multi-branch model can be trained and configured to identify one or more targets and segment those targets within input imaging data. Each multi-branch model will output target mask data, which includes a plurality of target masks (e.g., a target mask for each image slice of the medical imaging data from block 202).

When multiple multi-branch models are used, a first multi-branch model can be used to segment based on a first target (e.g., calcium in coronary tissue) and a second multi-branch model can be used to segment based on a second target (e.g., a silhouette of the heart). The outputs of one or more multi-branch models can be used together to further improve the analysis of the imaging data.

Each multi-branch model can have a multi-branch architecture as disclosed herein. A multi-branch model can include a main branch and an attention branch. The main branch can receive a single image slice at a time for processing, while the attention branch can receive the single image slice and one or more adjacent image slices for processing. For each single image slice, each branch of the multi-branch model can generate a respective output mask (e.g., feature mask). For each single image slice, the respective output masks can be used together to generate the target mask.

At block 206, a plurality of ordered image slices from the medical imaging data 202 can be provided to the multi-branch model(s). Providing these ordered image slices can include providing a particular image slice to the main branch of the multi-branch model, providing that same particular image slice and one or more adjacent (e.g., subsequent and/or prior) image slices to the attention branch. In some cases, all image slices can be provided to the attention branch at a single time. Image slices provided to the attention branch are provided sequentially.

In an example, providing the ordered image slices at block 206 can include sequentially providing each image slice of the plurality of ordered image slices to both the main branch and attention branch of the multi-branch model. The multi-branch model can then process each sequential image slice as appropriate, with the main branch sequentially processing each image slice individually, and the attention branch sequentially processing each image slice in a recurrent fashion.

The number of image slices received by an attention branch at a time can be based on how the attention branch is configured. In some cases, the attention branch can be configured to have a memory capable of handling up to three image slices at a time (e.g., a select image slice and two immediately adjacent image slices). Any suitable memory configuration can be used to be able to handle additional or fewer images slices at a time.

At block 208, a plurality of output target masks can be generated automatically by the multi-branch model(s) in response to being provided with the ordered image slices. Each target mask is representative of regions of a given image slice that are identified as being the target. For example, if a target is a pleural lesion, the target mask is representative of regions of the given image slice that are identified as being a lesion. In another example, if the target is calcium, the target mask is representative of regions of the given image slice that are identified as being calcium. A plurality of output target masks is generated at block 208, with a respective output target mask for each of the plurality of ordered image slices provided at block 206.

At block 210, a quantitative score is generated using the plurality of output target masks. Generating a quantitative score can include generating one or more measurements using the plurality of output target masks. For example, measurements that can be generated using one or more of the plurality of output target masks include three-dimensional volumes of the target, two-dimensional areas of the target, one-dimensional lengths of the target, intensities associated with the target (e.g., maximum brightness or average brightness of all voxels within a target region), and other such measurements. These measurements can be compared with other measurements, such as volumes, areas, targets, or intensities of regions that are not the target region.

In some cases, the plurality of output target masks can be used to generate non-measurement scores, such as a score in a range of zero to five that indicates the severity of a condition associated with the target.

In some cases, the plurality of output target masks can be passed to a further machine learning algorithm to generate a desired quantitative score.

In some cases, such as when the received medical imaging data includes CTAC imaging data, generating the quantitative score at block 210 includes generating a coronary artery calcium score at block 212. Generating the CAC score can be performed as disclosed herein. In some cases, generating a CAC score can be based on a first set of output target masks from a first multi-branch model and second set of output target masks from a second multi-branch model. The first multi-branch model can be trained to segment calcium in the imaging data, whereas the second multi-branch model can be trained to segment, or define, the heart boundaries within the imaging data. This second model can be used to remove calcium lesions that were detected outside the heart so that they do not undesirably affect the quantification. Once the target regions identified as being calcium lesions within the heart are identified, standard procedures for determining a CAC score from the annotated imaging data can be used.

In an example, standard procedures for determining a CAC score (e.g., an Agatston score) include measuring the peak density of the calcification (e.g., calcified regions in the imaging data) in Hounsfield units, determining an initial score based on the density measurement (e.g., a score of 1 for 130-199 HU, 2 for 200-299 HU, 3 for 300-399 HU, and 4 for 400 HU and greater), multiplying that initial score by the area of the calcification in square millimeters for each image slice to obtain a slice score, then summing together the slice scores. For example, in an image slice if the target regions identified by the multi-branch models have a peak density of 250 HU and occupy an area of 4 $mm^2$, resulting in a slice score of 8. Depending on the size of the target region(s) (e.g., the calcium lesion(s)), the various slice scores may add up to a full CAC score of 75, indicative of mild levels of plaque detection.

Generating the CAC score according to process 200 can permit a CAC score to be easily generated automatically and quickly. Further, since the CAC score can be generated from imaging data that is CTAC imaging data, the CAC score can be generated immediately after the patient undergoes a PET/CTAC scan, without requiring the patient undergo any additional CT scans.

In some cases, such as when the received medical imaging data includes CT imaging data of a patient's lungs, generating the quantitative score at block 210 includes generating a pneumonia burden score at block 214. Generating the pneumonia burden score can be performed as disclosed herein. In some cases, generating a pneumonia burden score can be based on one or more multi-branch models trained to identify target regions that are GGO and high-opacities (e.g., consolidation and pleural effusion). The plurality of output target masks provide segmentation information about these target regions. In some cases, the target masks can be edited, such as to differentiate consolidation from pleural effusion. A pneumonia burden score can be represented as the percentage of the total lung volume occupied by the lesions. In other words, $$\text{Pneumonia Burden} = \frac{\text{Total Lesion Volume}}{\text{Total Lung Volume}} \times 100\%.$$

In some cases, such as when the received medical imaging data includes CT imaging data of a patient's lungs, a lobar severity score can be calculated instead of or in addition to a pneumonia burden score at block 214. The lung can be split into a number of lobes, such as a right upper lobe, a right middle lobe, a right lower lobe, a left upper lobe, and a left lower lobe. A lobar severity score can be calculated as a percentage of the volume of a particular pulmonary lobe occupied by lesions (e.g., parenchymal opacities involving GGO and consolidations) within that lobe. Each individual lobar severity score can be represented as a number from 0 to 5 (e.g., 0 for no involvement; 1 for involvement between 0% and 5%; 2 for involvement between 5% and 25%; 3 for involvement between 25% and 50%, 4 for involvement between 50% and 75%; and 5 for involvement over 75%). A total lobar severity score can be the sum of each individual lobar severity score. The total lobar severity score can be between 0 and 25 points.

In some cases, such as when the received medical imaging data includes CT imaging data of a patient's lungs, a segmental severity score can be calculated instead of or in addition to a pneumonia burden score at block 214. The lung can be split into 20 pulmonary segments. Individual segmental severity scores can be calculated as a percentage of the volume of a particular pulmonary segment occupied by lesions (e.g., parenchymal opacities involving GGO and consolidations) within that segment. Each individual segmental severity score can be represented as a number from 0 to 2 (e.g., 0 for no involvement; 1 for involvement between 0% and 50%; and 2 for involvement over 50%). A total segmental severity score can be the sum of each individual segmental severity score. The total segmental severity score can be between 0 and 40 points.

In some cases, such as when the received medical imaging data includes CCTA imaging data, generating the quantitative score at block 210 includes generating a plaque volume measurement at block 216. Generating the plaque volume measurement can be performed as disclosed herein. In some cases, generating a plaque volume measurement can be based on one or more multi-branch models trained to identify target regions that are plaque lesions in CCTA imaging data. Once the target regions are segmented, the output target masks can be used to calculate the individual plaque volume of any individual lesion or the total plaque volume of all lesions. Any plaque volume measurement can then be presented to a user and/or used for further purposes. For example, the plaque volume measurement can be used to determine a plaque burden, which is the percentage of total region of interest volume (e.g., total coronary artery volume within the imaging data) occupied by the plaque volume. The region of interest can be the coronary artery, an entire coronary tree, or any suitable regions. A region of interest, whether used with reference to block 216 or elsewhere herein, can be defined in a pre-processing step manually (e.g., a user manually defining the boundaries), semi-automatically (e.g., a user providing manual input to facilitate an automated system defining the region of interest), or automatically (e.g., the imaging data can be passed to an automated system that defines the region of interest without manual intervention).

In some cases, such as when the received medical imaging data includes CCTA imaging data, generating the quantitative score at block 210 includes generating a stenosis severity score at block 216. Generating the stenosis severity score can be performed as disclosed herein. In some cases, generating a stenosis severity score can be based on one or more multi-branch models trained to identify target regions that are plaque lesions in CCTA imaging data. Once the target regions are segmented, the output target masks can be used to calculate the maximal diameter stenosis within the region of interest. In some cases, maximal diameter stenosis can be calculated for each of the 18 segments of the Society of Cardiovascular Computed Tomography (SCCT) model of the coronary tree. An individual stenosis severity score can be generated for each segment based on the percentage of stenosis (e.g., a percentage of the artery's diameter blocked by a lesion as identified in the output target masks). For example, a score of 0 for no plaque and no luminal stenosis; a score of 1 for minimal plaque with less than 25% stenosis; a score of 2 for 25% to 49% stenosis; a score of 3 for 50% to 69% stenosis; a score of 4 for 70% to 99% stenosis, and a score of 5 for 100% stenosis (e.g., occluded). A final stenosis severity score can be based on the individual stenosis severity scores. In some cases, the final stenosis severity score is the highest individual stenosis severity score.

At optional block 222, the quantitative score generated at block 210 can be used to facilitate determination of a diagnosis and/or a prognosis. In some cases, facilitating determination of a diagnosis include providing a diagnosis based on the quantitative score. In some cases, facilitating determination of a diagnosis include providing a list of suggested diagnoses based on the quantitative score. In some cases, facilitating determination of a prognosis includes providing a prognosis based on the quantitative score. In some cases, facilitating determination of a prognosis includes providing a list of possible prognoses based on the quantitative score. In some cases, facilitating determination of a prognosis includes providing a likelihood percentage associated with a prognosis (e.g., a single prognosis or each prognosis in a list of possible prognoses). The likelihood percentage associated with a prognosis can be based on the quantitative score and can be an indication of the likelihood that the prognosis will occur.

In some cases, at block 220, a display can be generated using the plurality of output target masks. The display can be any visual indication of information associated with the plurality of output target masks. In an example, the plurality of output target masks from block 208 can be applied to the medical imaging data from block 202 to generate a two-dimensional or three-dimensional image of the subject of the medical imaging data (e.g., a lung or a heart), with the target regions (e.g., lesions) highlighted or otherwise presented in a visually distinguishable manner. Generating the display at block 220 can include generating the display and presenting the display using a display device (e.g., a computer monitor). In some cases, generating the display at block 220 can include printing the display on a medium, such as by creating a two-dimensional or three-dimensional print of the subject with the target regions presented in a distinguishable fashion (e.g., visually distinguishable by color or pattern, or tactilely distinguishable by a surface pattern or material change). In some cases, generating the display at block 220 can further include generating the display using the quantitative score from block 210. For example, the display can include the quantitative score.

While process 200 is depicted with certain blocks in certain orders, in some cases, process 200 can include additional blocks and/or some existing blocks can be removed. In some cases, blocks can be performed in different orders.

Figure 3:
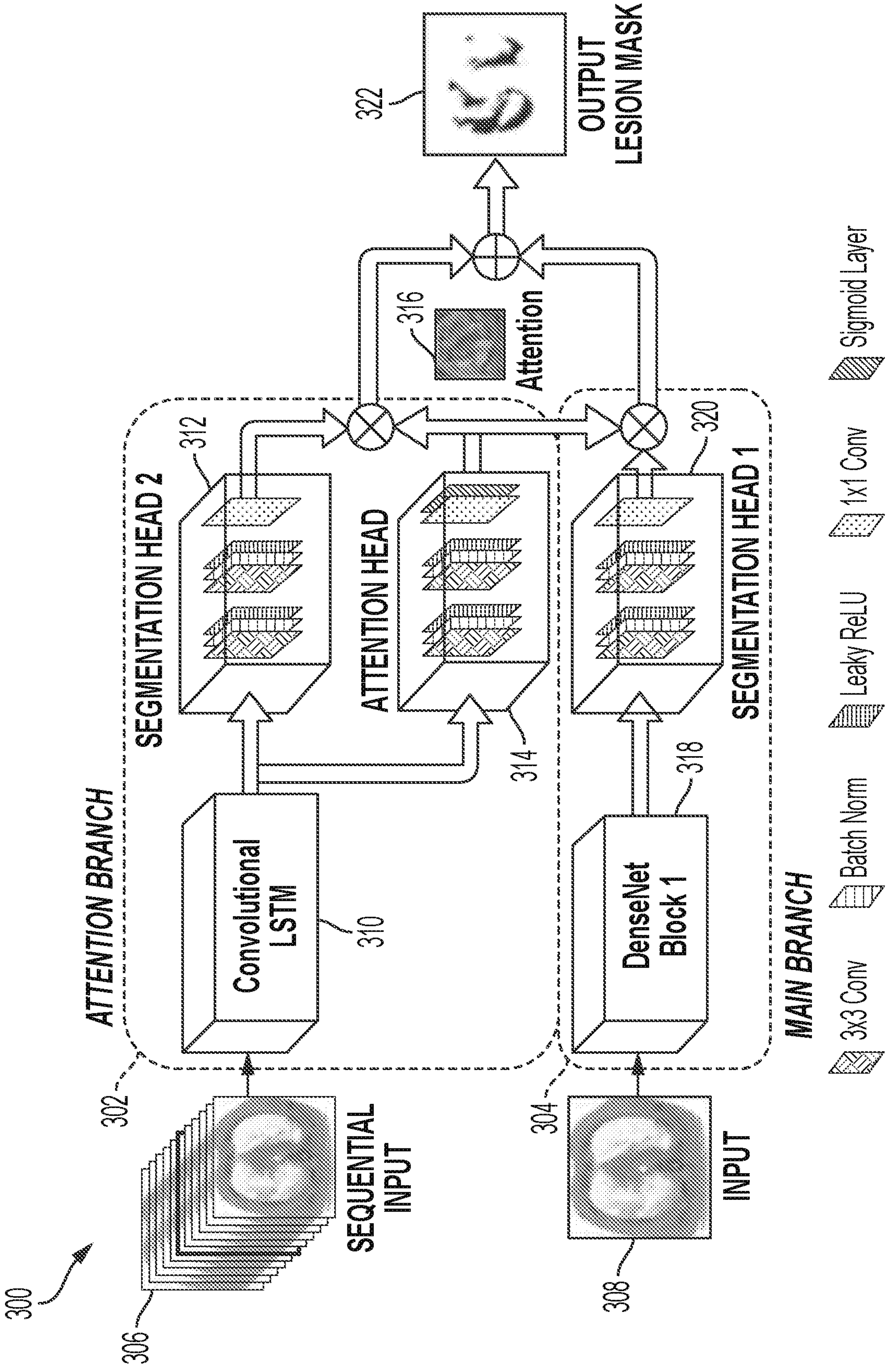
FIG. 3 is a schematic representation of a multi-branch model, according to certain aspects of the present disclosure.

FIG. 3 is a schematic representation of a multi-branch model 300, according to certain aspects of the present disclosure. The model architecture is based on hierarchical multi-scale attention for semantic segmentation with the attention head looking through several adjacent slices above and below the current slice to improve lesion recognition. The architecture is divided into two branches. A main branch 304 and an attention branch 302.

The main branch 304 includes a dense block 318 followed by a segmentation head 320. The main branch 304 can extract larger and easy-to-classify targets (e.g., pleural lesions).

The attention branch 302 includes a sequential processor: a ConvLSTM block 310 followed by a segmentation head 312 and an attention head 314. The ConvLSTM block 310 allows the model 300 to consider adjacent image slices, such as adjacent image slices of a CT scan to detect lung abnormalities and ensure appropriate annotation. The attention head 314 synergizes with the ConvLSTM block 310 to correct borderline misclassifications of the main branch 304.

Each segmentation head 312, 320 comprises three blocks: the first two blocks each include a 3x3 convolutional layer followed by a batch normalization layer and a LeakyRelu activation layer, while the final block includes a 1×1 convolutional layer. The attention head 314 is identical to the segmentation head 312 in structure, with the only difference being the last block is followed by an additional Sigmoid layer.

The main branch 308 receives a single image slice 308 as input. The attention branch 302 receives as input multiple image slices, which can be multiple sequential image slices 306. The multiple sequential image slices 306 received by the attention branch 302 generally include the single image slice 308 and one or more adjacent slices. In some cases, the attention branch 302 makes use of the single image slice 308, an immediately previous image slice, and an immediately subsequent image slice. Thus, the ConvLSTM block 310 processes sequentially a total of three consecutive slices and conveys its output to the attention head 314 and segmentation head 312 of the attention branch 302.

The output of the attention head 314 can then be multiplied with the respective semantic feature maps of the two segmentation heads 312, 320, and then combined to achieve the output target mask 322. In other words, $S_{out}=\alpha S_{main}+(1-\alpha)S_{attn}$, where $S_{out}$ is the output target mask 322, $S_{main}$ is the output feature map of the segmentation head 320 of the main branch 304, $S_{attn}$ is the output feature map of the segmentation head 312 of the attention branch 302, and $\alpha$ is the output of the attention head.

In some cases, the attention head 314 can output an attention map 316.

The model 300 can be initialized and trained using any suitable technique. In some cases, the entire model 300 is initialized using Kaiming He initialization, except for the dense block, for which pre-trained weights from ImageNet can be used. Region Mutual Information (RMI) loss can be used as the cost function. The model parameters can be optimized using a Stochastic Gradient Descent optimizer with a momentum of 0.9, the initial learning rate of $10^{-3}$, and weight decay of $10^{-6}$. The learning rate can be gradually decreased using Reduce on Plateau technique with a factor of 0.1 and patience of 10. This learning rate scheduler can keep track of validation loss. In some cases, where no improvement is seen for a "patience" number of epochs, the learning rate can be reduced by the given "factor." The training batch size can be 32. The training can be stopped as soon as the learning rate reaches $10^{-7}$.

In the first experimental example disclosed herein, the training dataset was acquired from multiple centers involving centers from North America (Cedars-Sinai Medical Center, Los Angeles), Europe (Centro Cardiologico Monzino, and Istituto Auxologico Italiano; both Milan, Italy), Australia (Monash Medical Centre, Victoria, Australia) and Asia (Showa Medical University, Tokyo, Japan). The code was written in Pytorch (v1.7.1) deep learning framework. The training was performed on Nvidia Titan RTX 24 GB GPU on a 10th generation Intel Core i9 CPU.

In the first experimental example disclosed herein, the per-patient mean dice scores from 5 independently trained identical models on 5-folds of the dataset are depicted in Table 3.

TABLE 3

| Fold | Number of cases (Train, Val, Test) | Mean Dice Score ± SD |
|---|---|---|
| 1 | (115, 22, 30) | 0.8751 ± 0.070 |
| 2 | (115, 22, 30) | 0.8683 ± 0.082 |
| 3 | (116, 22, 29) | 0.8870 ± 0.066 |
| 4 | (116, 22, 29) | 0.8672 ± 0.085 |
| 5 | (116, 22, 29) | 0.8904 ± 0.065 |
| Mean ± SD | | 0.8776 ± 0.0095 |

Figure 4:
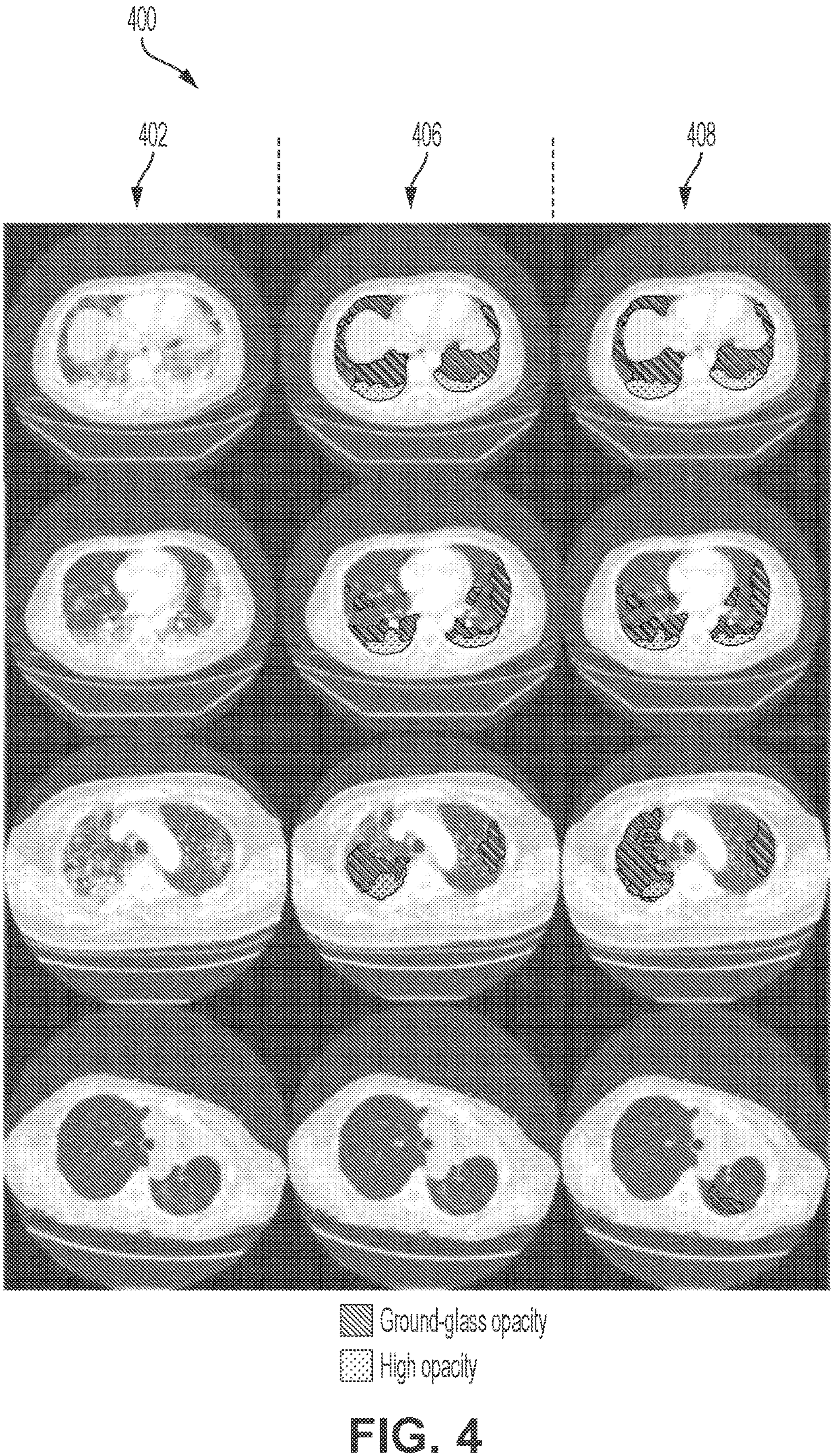
FIG. 4 is a set of images comparing input image slices, manually annotated image slices, and image slices automatically annotated, according to certain aspects of the present disclosure.

From the last column, it is apparent that there is no variation in the models trained with 5 different folds. The overall Spearman volume correlation between expert and automatic annotations (N=167) were 0.9448 ($p<0.0001$) and 0.8797 ($p<0.0001$) for ground-glass opacities and high opacities, respectively FIG. 4 is a set of images 400 comparing input image slices, manually annotated image slices, and image slices automatically annotated, according to certain aspects of the present disclosure. The set of images 400 include a set of input image slices 402, a set of manually annotated image slices 404, and a set of automatically annotated image slices 406. The automatically annotated image slices 406 can be annotated using output target masks as disclosed herein. The automatically annotated image slices 406 can be generated using the model 300 of FIG. 3.

As depicted specifically in FIG. 4, the automatically annotated image slices 406 are generated using a model as disclosed with reference to the first experimental example disclosed herein.

For each of the input image slices 402, a corresponding manually annotated image slice (e.g., from the set of manually annotated image slices 404) and an automatically annotated image slice (e.g., from the set of automatically annotated image slices 406) are depicted. As seen when comparing the set of manually annotated image slices 404 to the set of automatically annotated image slices 406, the automatic annotation agrees significantly with manual annotation.

Figure 5:
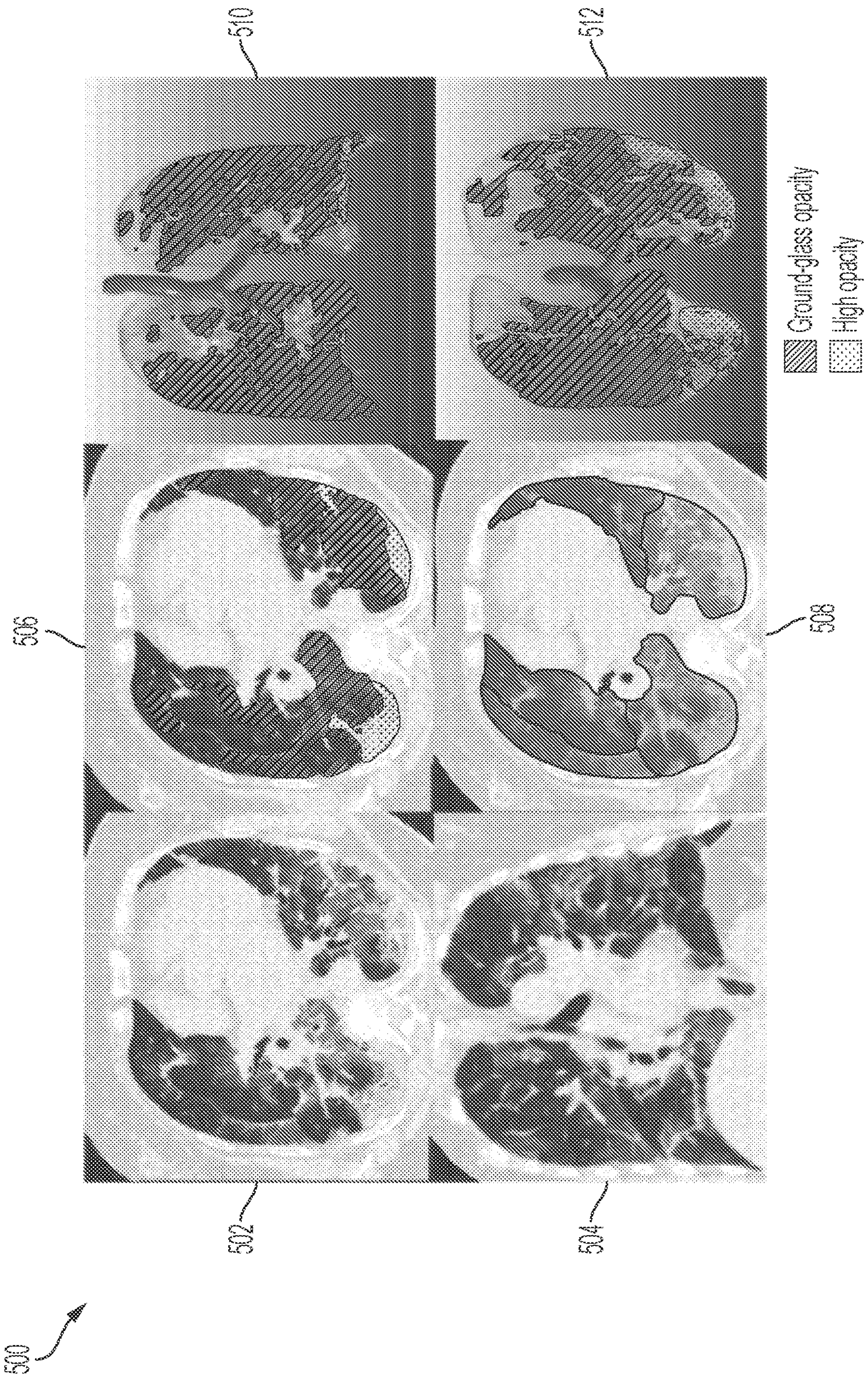
FIG. 5 is a set of images depicting image slices, automatically annotated image slices, and three-dimensional annotated renderings, according to certain aspects of the present disclosure.

FIG. 5 is a set of images 500 depicting image slices, automatically annotated image slices, and three-dimensional annotated renderings, according to certain aspects of the present disclosure. The set of images 500 are from the second experimental example disclosed herein, and are based on the chest CT of an 83-year-old woman with COVID-19 pneumonia who died seven days after imaging.

The set of images 500 include images 502, 504 showing a standard lung window (width of 1500 Hounsfield units [HU] and level of −400 HU); image 506 depicting AI-assisted annotation of GGOs and high-opacities (e.g., comprising consolidation and pleural effusion) that were segmented using a ConvLSTM network, such as disclosed with reference to model 300 of FIG. 3; image 508 depicting the right lung divided into upper, middle and lower lobes by the horizontal and oblique fissures, and the left lung divided into upper and lower lobes by the oblique fissure; and images 510, 512 depicting three-dimensional lung renderings with annotated distribution of lesions as provided by a multi-branch model as disclosed herein. The three-dimensional lung renderings of images 510, 512 are depicted in the coronal and axial planes, respectively. The three-dimensional lung renderings of images 510, 512 can be used to calculate total pneumonia burden (e.g., total pneumonia burden calculated as total lesion volume/total lung volume× 100%).

Figure 6:
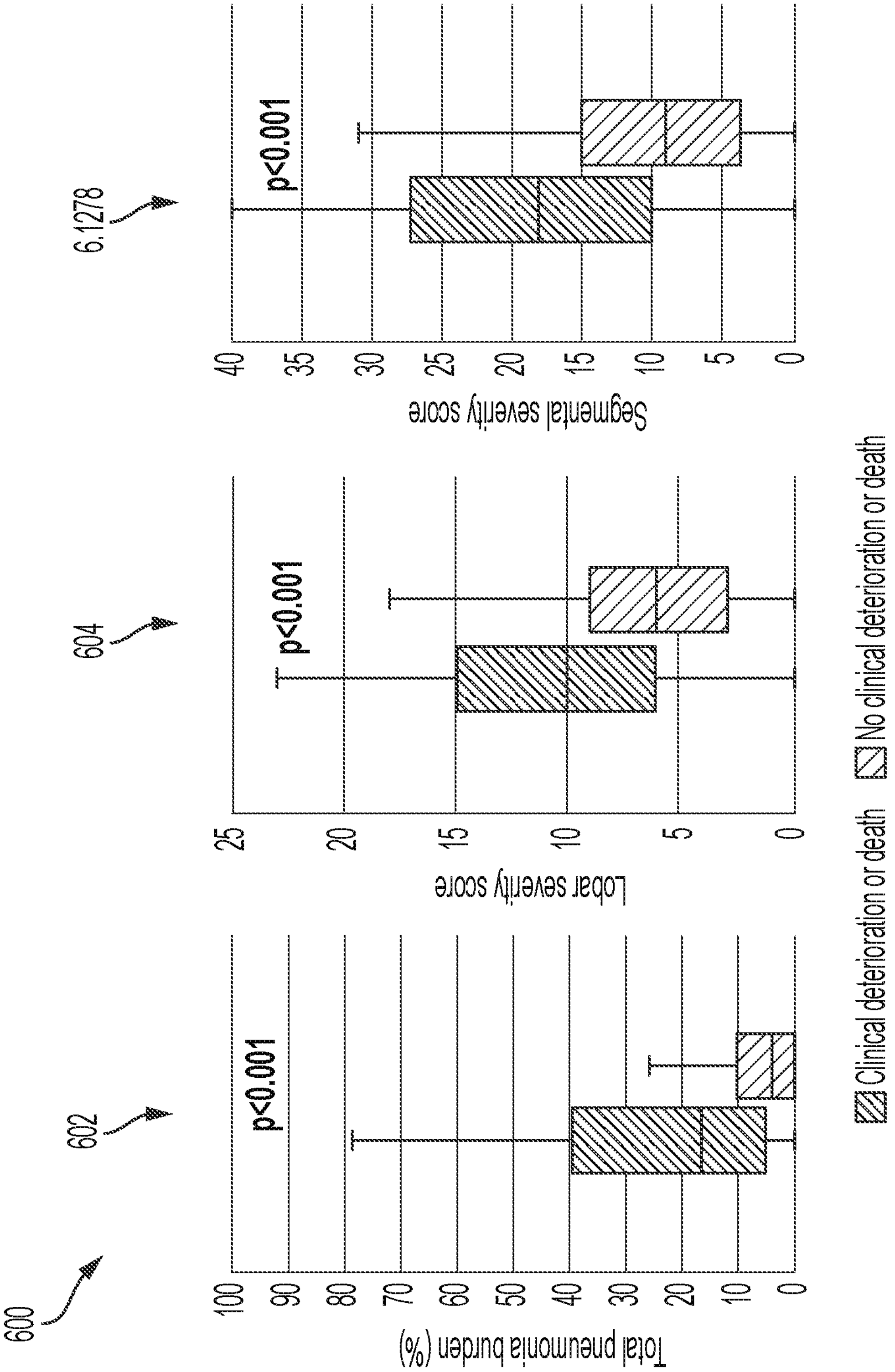
FIG. 6 is a set of charts comparing automatically determined qualitative scores for patients with and without clinical deterioration or death, according to certain aspects of the present disclosure.

FIG. 6 is a set of charts 600 comparing automatically determined qualitative scores for patients with and without clinical deterioration or death, according to certain aspects of the present disclosure. The data for charts 600 comes from the second experimental example as disclosed herein. Charts 602, 604, 606 depict box plots demonstrating the median, interquartile range $25^{th}$-$75^{th}$, and minimum and maximum values.

Charts 602. 604, 606, show that pneumonia burden, lobar severity score, and segmental severity score, respectively, are higher in patients with clinical deterioration or death than in patients without. The pneumonia burden as calculated in chart 602 is automatically calculated using the multi-branch model disclosed herein, such as model 300 of FIG. 3.

Figure 7:
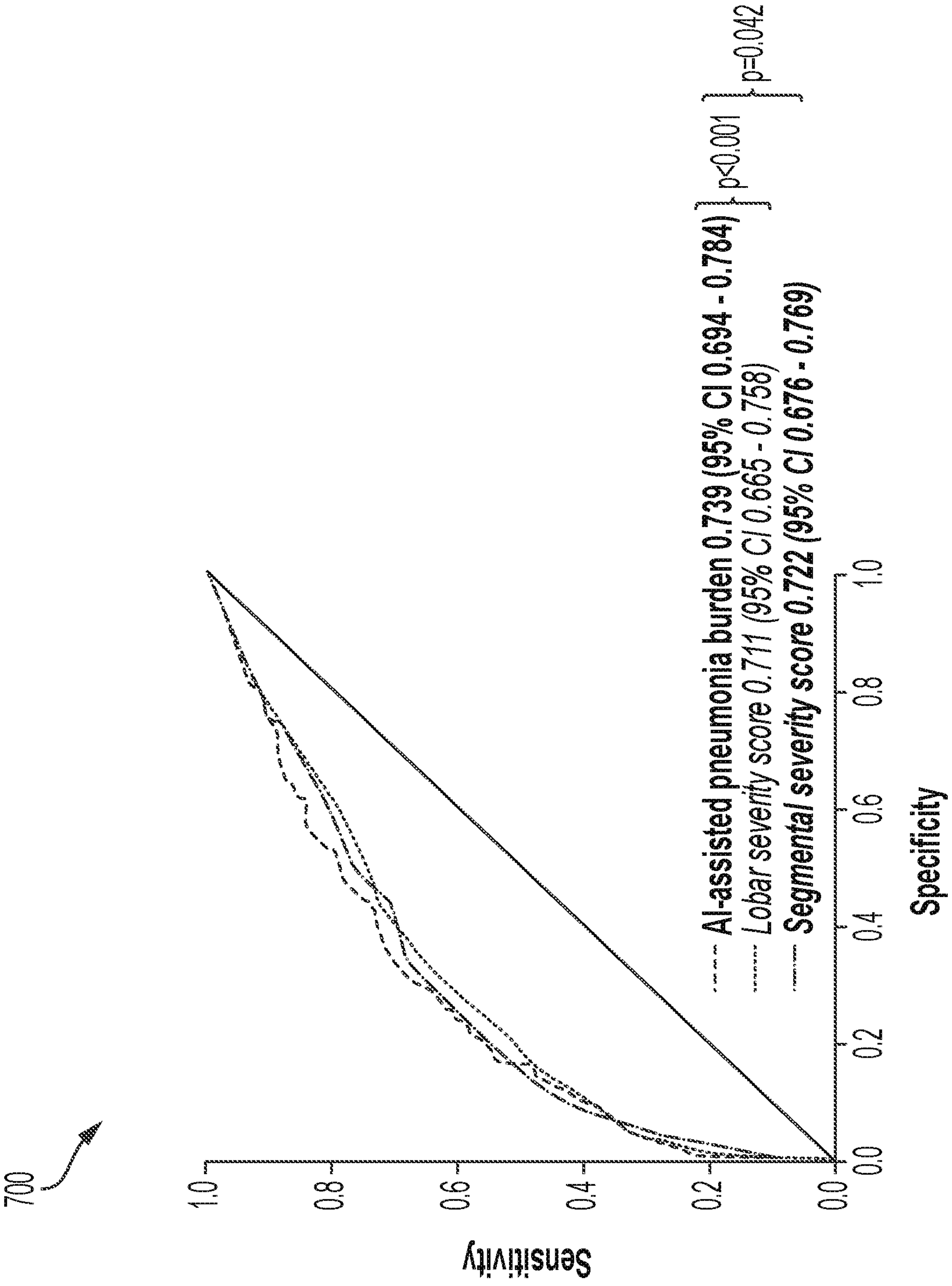
FIG. 7 is a chart depicting the performance of different pneumonia scoring systems compared to automatic pneumonia scoring, according to certain aspects of the present disclosure.

FIG. 7 is a chart 700 depicting the performance of different pneumonia scoring systems compared to automatic pneumonia scoring, according to certain aspects of the present disclosure. The data for chart 700 comes from the second experimental example as disclosed herein.

With respect to the second experimental example, for the prediction of the primary outcome, the AUC for AI-assisted pneumonia burden (0.739) was significantly higher than that of the visual lobar severity score (0.711, p<0.001) and visual segmental severity score (0.722, p=0.042). The sensitivities and specificities were: 68% and 70% for AI-assisted pneumonia burden; 48% and 84% for lobar severity score; was 51% and 83% for segmental severity score.

Chart 700 shows that the AI-assisted pneumonia burden disclosed herein for the prediction of the primary outcome performs very well in comparison to other techniques.

Figure 8:
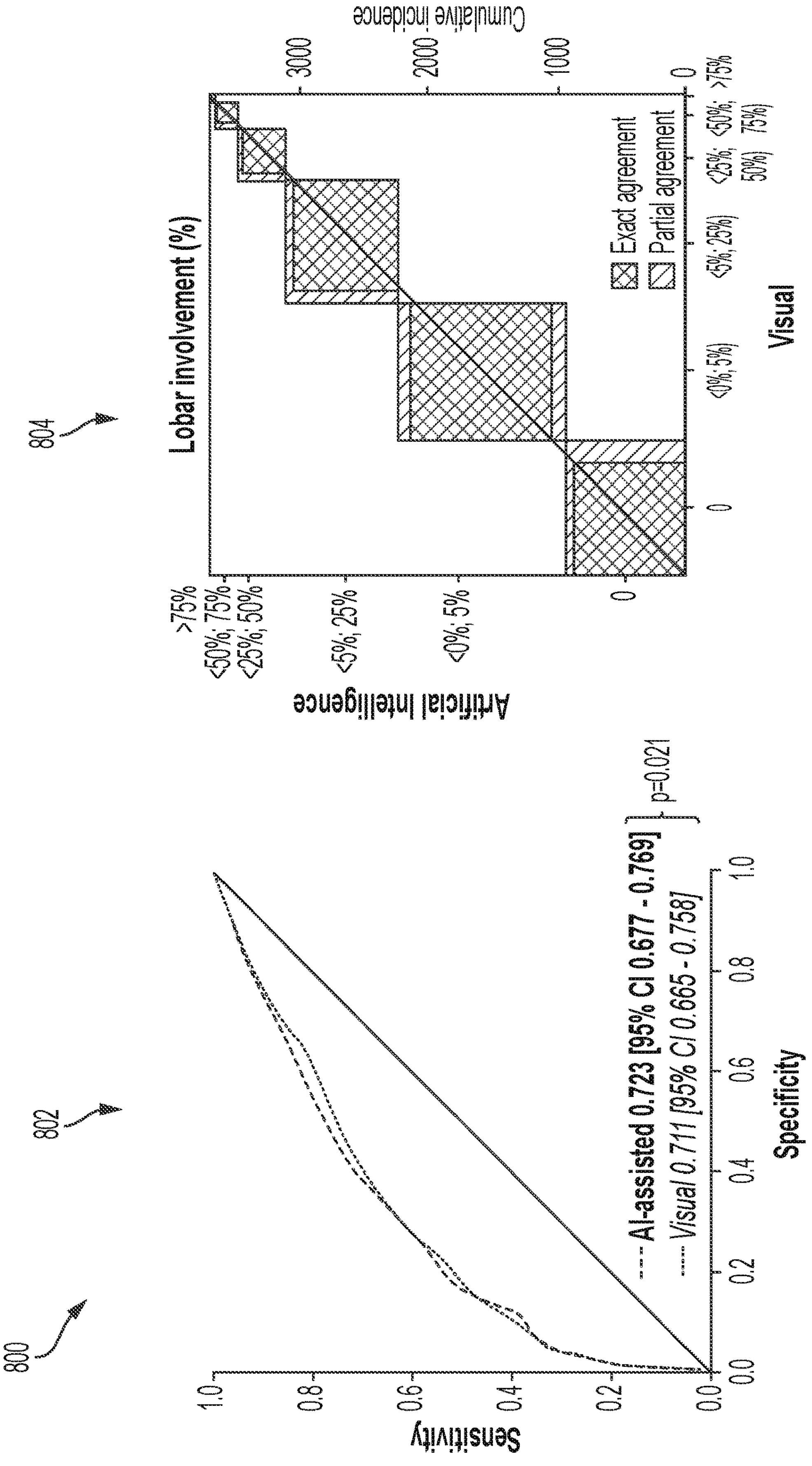
FIG. 8 is a set of charts comparing the performance of lobar severity scores estimated visually and automatically, according to certain aspects of the present disclosure.

FIG. 8 is a set of charts 800 comparing the performance of lobar severity scores estimated visually and automatically, according to certain aspects of the present disclosure. The data for the set of charts 800 comes from the second experimental example as disclosed herein.

To compare the performance of the lobar severity score between expert reader and AI, lobar involvement of the opacifications calculated using a deep-learning algorithm (e.g., a multi-branch model as disclosed herein, such as model 300 of FIG. 3) was translated into semi-quantitative scores as described. The agreement between visual and AI-assisted lobar severity scores was substantial (weighted kappa=0.609). Chart 802 shows that AI-derived lobar severity score achieved higher predictive accuracy for clinical deterioration than visual expert reading (AUC of 0.723 vs 0.711, p=0.043), but underperformed compared to the input pneumonia burden (AUC of 0.723 vs 0.739, p=0.021). Chart 804 shows that the estimation of pneumonia involvement for individual lobes showed an excellent level of agreement (weighted kappa=0.862).

Out of 3715 lobes, discordant classification was noted in 387 (10.4%) of them. The NRI values were 0.3% and 0.4% in patients without and with clinical deterioration, respectively. Thus, the total NRI was-0.1% (p=0.994).

Figure 9:
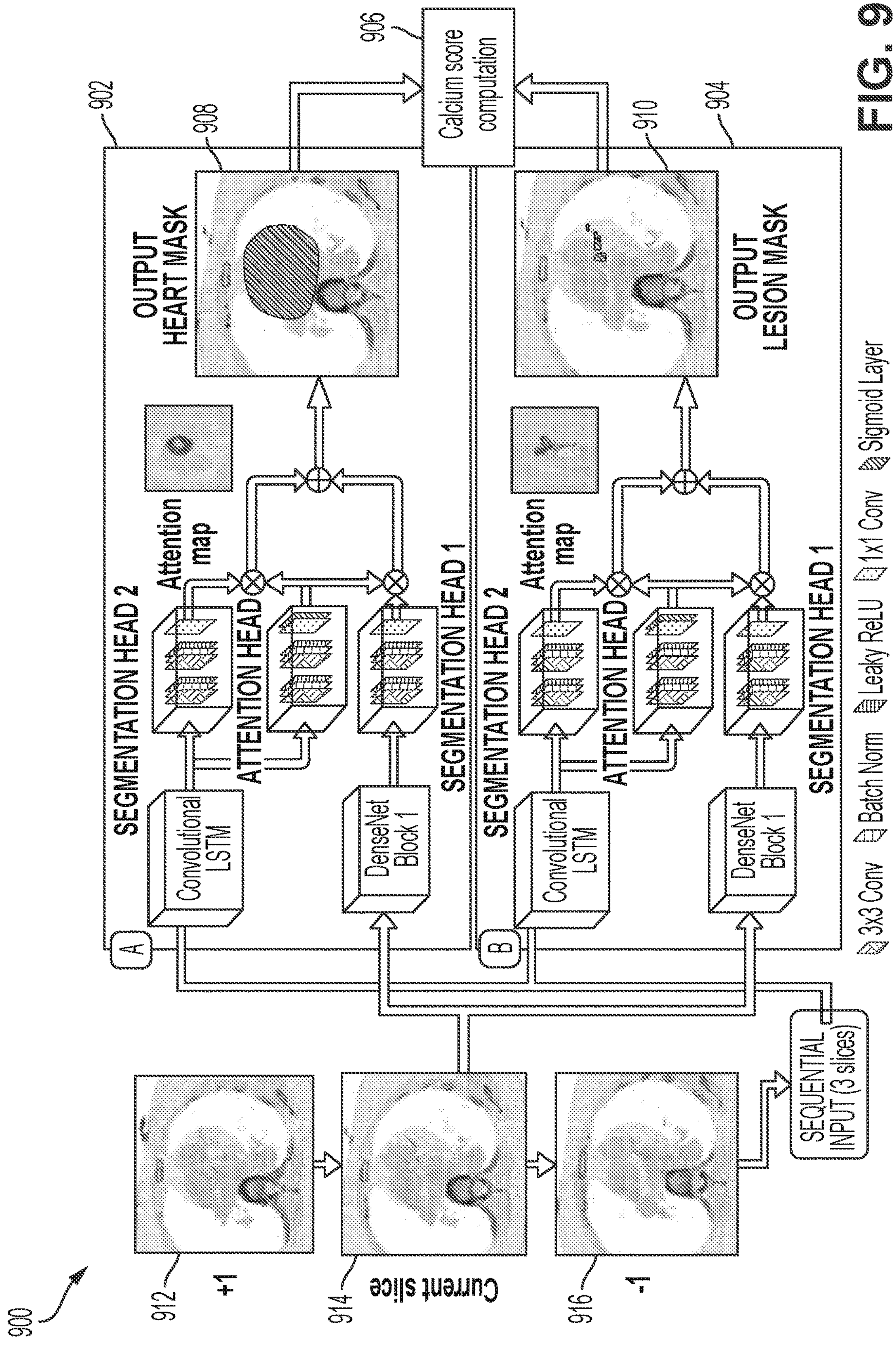
FIG. 9 is a schematic representation of a dual multi-branch model architecture for evaluating coronary calcium buildup, according to certain aspects of the present disclosure.

FIG. 9 is a schematic representation of a dual multi-branch model 900 architecture for evaluating coronary calcium buildup, according to certain aspects of the present disclosure. Each individual model 902, 904 of the dual multi-branch model 900 can be similar to model 300 of FIG. 3, although trained for a different purpose. Model 902 can be trained to identify and segment calcium lesions, whereas model 904 can be trained to identify and segment the heart boundaries.

The CT slice 914 and its adjacent slices 912, 916 are fed to both model 902 and model 904, optionally simultaneously, to obtain a calcium score computation 906 or other similar quantitative measurement or mask of calcium lesions.

The proposed architecture is based on a modified version of hierarchical multi-scale attention for semantic segmentation. A CT slice 914 is passed as an input to the main segmentation block of each model 902, 904 for spatial information, while sequential input of adjacent slices 912, 916 is fed to the ConvLSTM block of each model 902, 904, for aggregation of temporal information. In some cases, the network can be built using the PyTorch library, although that need not always be the case.

The main segmentation branch consists of a dense block and a segmentation head. The secondary branch is a sequential processor: a ConvLSTM block followed by segmentation and attention heads.

In some cases, data preprocessing can occur, involving min-max thresholding between −800 Houndsfield Units (HU) and 1200 HU. In some cases, the final output is a 3-class segmentation mask (background, coronary calcium, non-coronary calcium).

With respect to the third experimental example, model 902 can be trained using a training set split into training (80%) and validation (10%) and 10% testing datasets from multiple (e.g., 3) cohorts. In order to counter the large class imbalance, focal loss is used as cost function between the ground truth expert reader annotation and network generated mask. Subset sampling is also applied to reduce the impact of the background (e.g., majority class).

A secondary ConvLSTM network (e.g., ConvLSTM block of the model 904) is used to similarly estimate the heart region to help eliminate spurious bone or sternum calcification. The model 904 can be trained on a set of 419 non-contrast chest CT scans with expert-annotated heart silhouette masks. Training can be performed with the Adam optimizer and Kaiming He initialization. Mean Dice score per class, Cohen's linearly weighted kappa metrics, concordance for agreement between predicted and reference categories were used as the evaluation metrics. The learning rate started at $10^{-3}$ and was dynamically reduced as the validation loss plateaued. Early stopping was utilized to reduce any form of overfitting. The model configuration providing the highest Dice score coefficient (0.849) on the internal validation set (n=956), with no overlap with testing cases) was chosen for further testing (using the internal and external testing sets).

Figure 10:
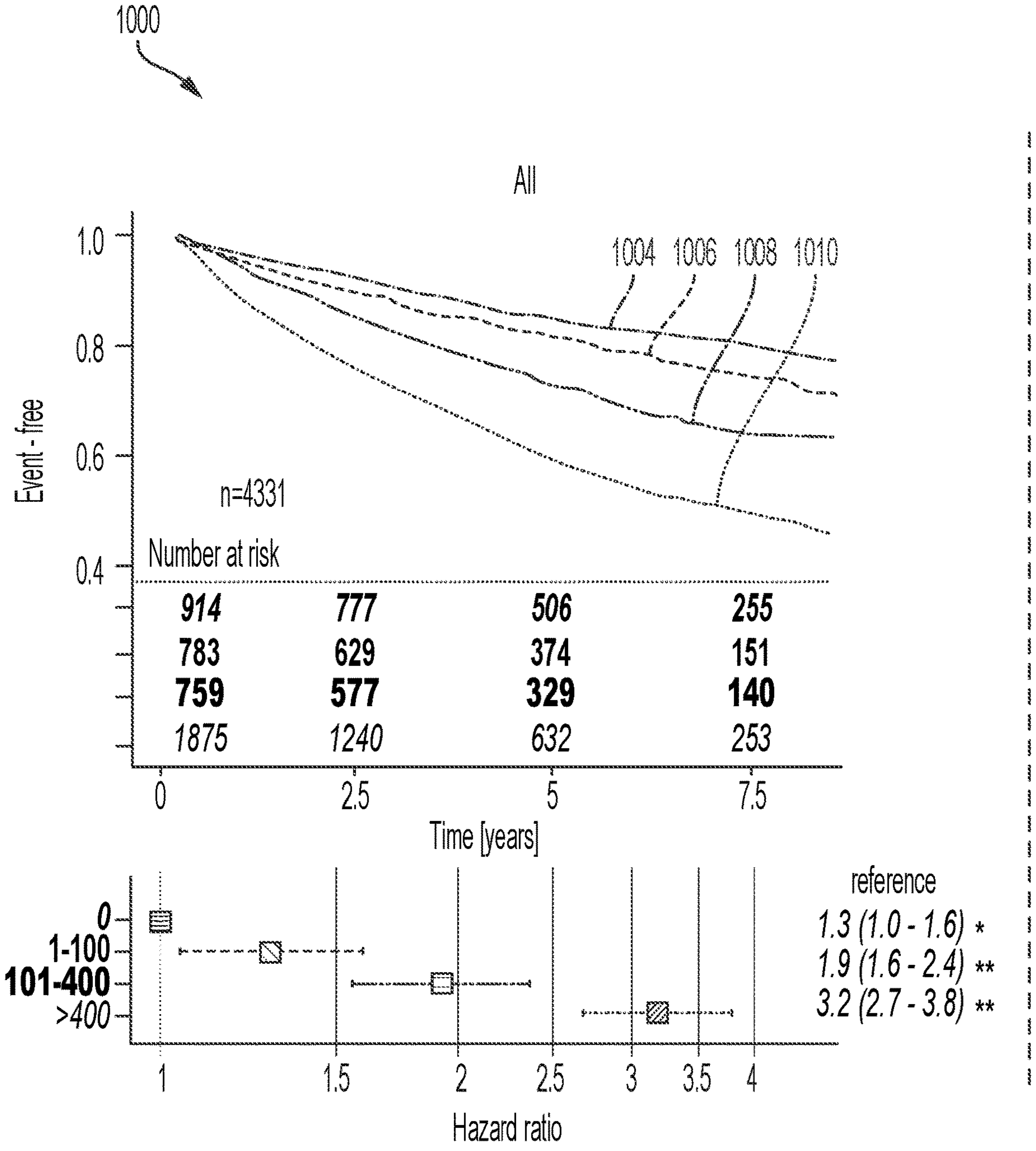
FIG. 10 is a set of charts depicting outcome analysis for calcium scores calculated from deep learning CAC segmentations of PET CTAC maps, according to certain aspects of the present disclosure.
Figure 10:
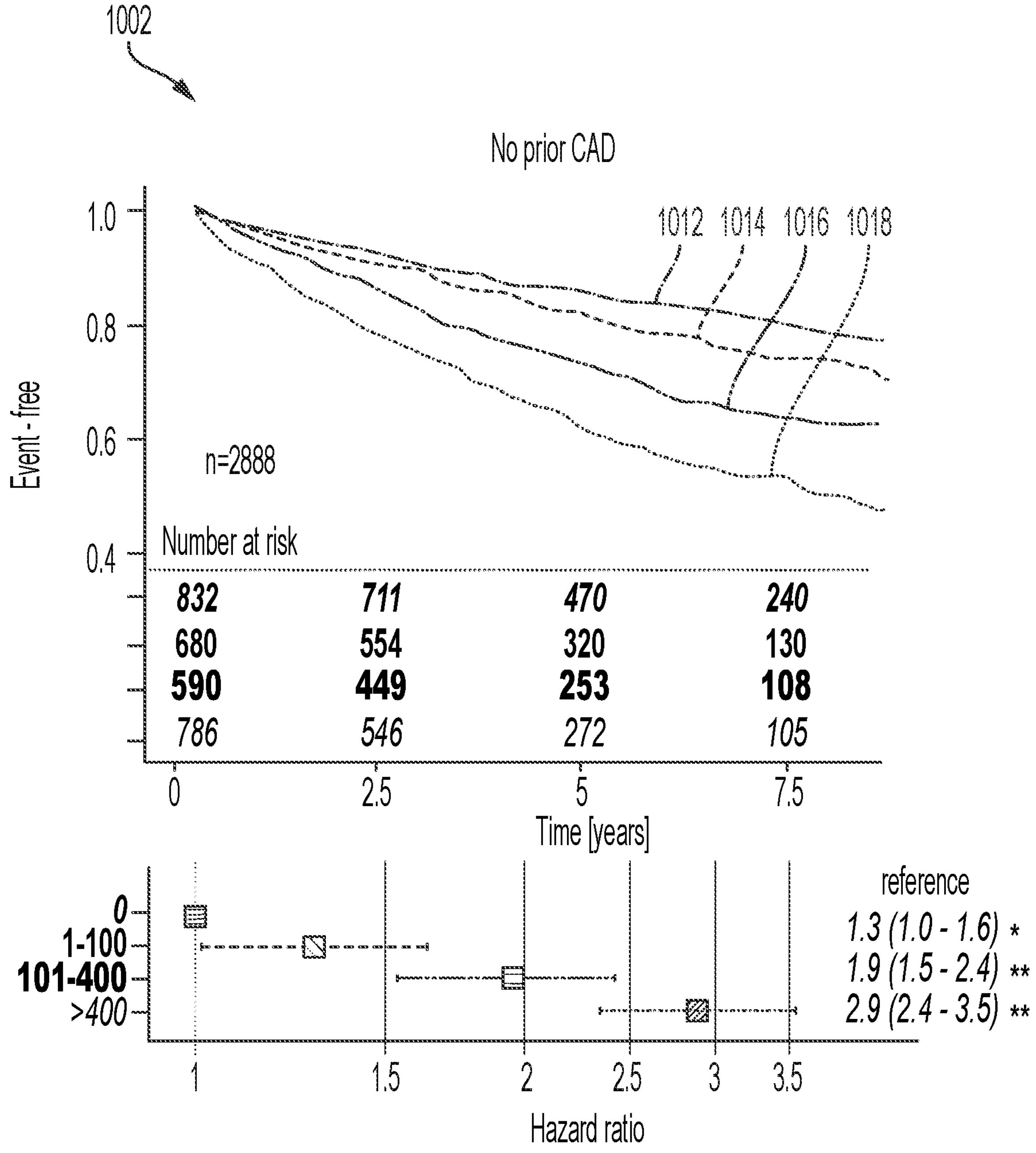

FIG. 10 is a set of charts 1000, 1002 depicting outcome analysis for calcium scores calculated from deep learning CAC segmentations of PET CTAC maps, according to certain aspects of the present disclosure. The data for charts 1000, 1002 comes from the third experimental example, as disclosed herein. For each chart 1000, 1002, the top portion of the chart shows the Kaplan-Meier curves for MACE risk by CAC score categories and the bottom portion shows the univariate MACE-risk analysis using proportional hazards COX model. P-values for Kaplan-Meier curves were calculated using log-rank tests.

The 4 CAC score categories included Absent (e.g., CAC score of 0) signified by line 1004; Discrete (e.g., CAC score of 1-100) signified by line 1006; Moderate (e.g., CAC score of 101-400) signified by line 1008; and Accentuated (e.g., CAC score of >400) signified by line 1010.

The total number of patients analyzed in chart 1000 was 4331. At year 0, 914 were scored as Absent, 783 were scored as Discrete, 759 were scored as Moderate, and 1875 were scored as Accentuated. At year 2.5, 777 were scored as Absent, 629 were scored as Discrete, 577 were scored as Moderate, and 1240 were scored as Accentuated. At year 5, 506 were scored as Ab-sent, 374 were scored as Discrete, 329 were scored as Moderate, and 632 were scored as Accen-tuated. At year 7.5, 255 were scored as Absent, 151 were scored as Discrete, 140 were scored as Moderate, and 253 were scored as Accentuated.

Chart 1000 shows the outcome analysis for all patients. Patients with DL-CTAC score >0 were more likely to experience MACE than patients with no CAC identified by deep learning in CTAC maps (log rank p-value=0.016 for CAC=0 vs. CAC 1-100, <0.0001 for remaining comparisons). HR for MACE increased with each category, with significantly higher risk in every DL-CTAC score category in comparison with DL-CTAC score of 0. Patients with DL-CTAC score >400 were at 3.2 (95% confidence interval [CI]: 2.7, 3.79) times higher risk of experiencing MACE in comparison with those with DL-CTAC score of 0. After adjusting for myocardial ischemia and flow reserve, the incremental pattern of HR was preserved with significantly increased risk in low (DL-CTAC score 1-100, HR 1.25, 95% CI: 1.01, 1.56, p=0.043), medium (DL-CTAC score 101-400, HR 1.74, 95% CI: 1.42, 2.13; p<0.001) and high scores (DL-CTAC>400, HR 2.45, 95% CI: 2.06, 2.92, p<0.001). In the whole external cohort (n=4331) DL-CTAC score of 0 had NPV of 82% for future MACE.

The analysis was repeated in a subset of patients with no history of CAD (n=2888), as depicted in chart 1002. The 4 CAC score categories included Absent (e.g., CAC score of 0) signified by line 1012; Discrete (e.g., CAC score of 1-100) signified by line 1014; Moderate (e.g., CAC score of 101-400) signified by line 1016; and Accentuated (e.g., CAC score of >400) signified by line 1018.

At year 0, 832 were scored as Absent, 680 were scored as Discrete, 590 were scored as Moderate, and 786 were scored as Accentuated. At year 2.5, 711 were scored as Absent, 554 were scored as Discrete, 449 were scored as Moderate, and 564 were scored as Accentuated. At year 5, 470 were scored as Absent, 320 were scored as Discrete, 253 were scored as Moderate, and 272 were scored as Accentuated. At year 7.5, 240 were scored as Absent, 130 were scored as Discrete, 108 were scored as Moderate, and 105 were scored as Accentuated.

Similar results with significantly increased MACE risk in each predicted DL-CTAC score category was seen. DL CTAC score of zero had NPV of 83% in the subset with no prior CAD.

Figure 11:
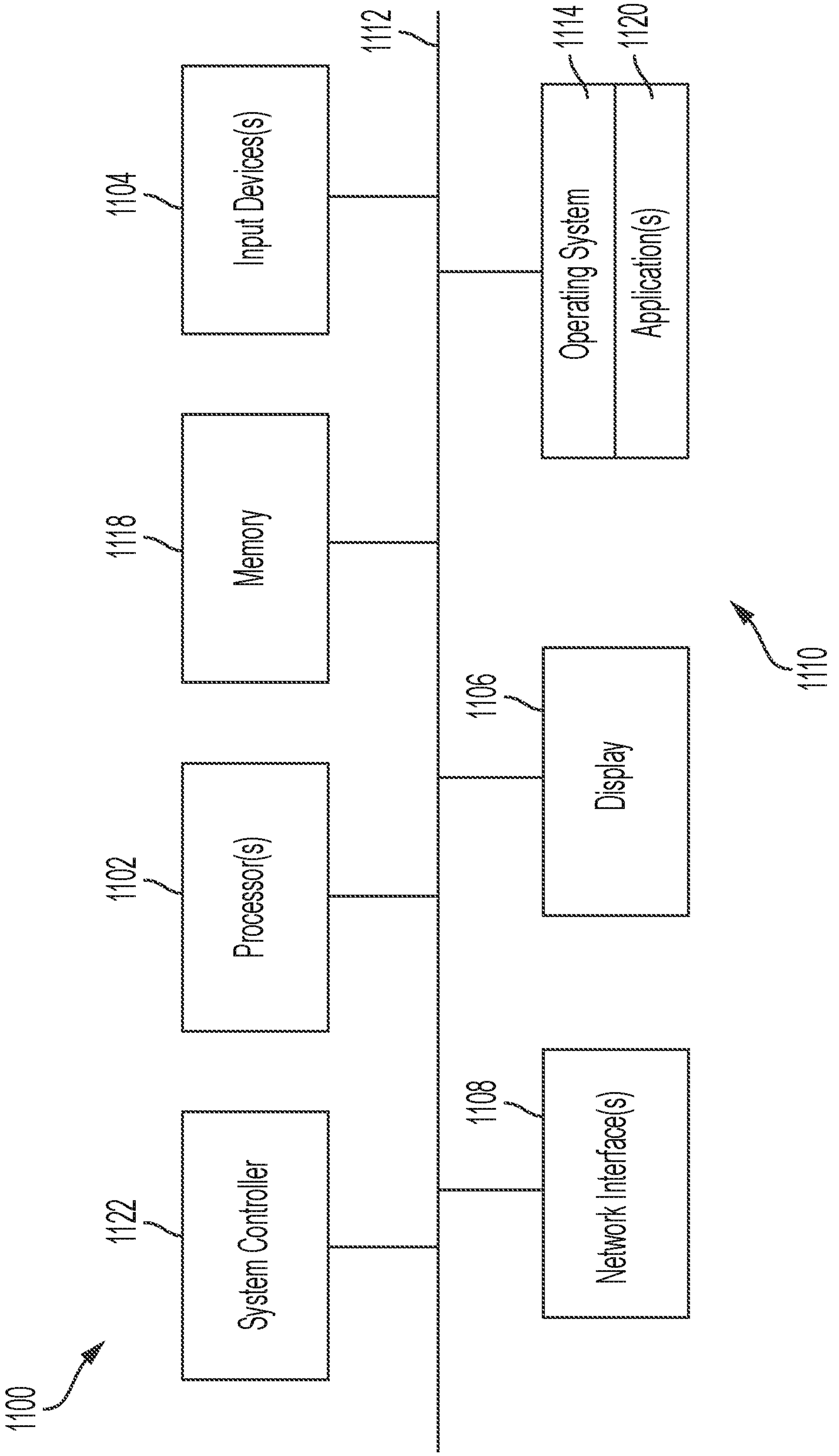
FIG. 11 is a block diagram of an example system architecture for implementing features and processes of the present disclosure.

FIG. 11 is a block diagram of an example system architecture 1100 for implementing features and processes of the present disclosure, such as those presented with reference to FIG. 2. The system architecture 1100 can be used to implement any suitable computing device (e.g., a server, workstation, tablet, imaging device, imaging data processing module, or other such device) for practicing the various features and processes of the present disclosure. The system architecture 1100 can be implemented on any electronic device that runs software applications derived from compiled instructions, including without limitation personal computers, servers, smart phones, electronic tablets, game consoles, email devices, and the like. In some implementations, the system architecture 1100 can include one or more processors 1102, one or more input devices 1104, one or more display devices 1106, one or more network interfaces 1108, and one or more computer-readable mediums 1110. Each of these components can be coupled by bus 1112.

In some cases, system architecture 1100 can be incorporated into a computing system capable of performing medical imaging, such as a computing system used to control a medical imaging device, such as a PET scanner, a CT scanner, or an MRI machine. In some cases, system architecture 1100 can be incorporated into a workstation computer used primarily for viewing and interpreting imaging data, such as a workstation located in the office of a medical professional interpreting the imaging data acquired at a different location (e.g., a different facility).

Display device 1106 can be any known display technology, including but not limited to display devices using Liquid Crystal Display (LCD) or Light Emitting Diode (LED) technology. Processor(s) 1102 can use any known processor technology, including but not limited to graphics processors and multi-core processors. Input device 1104 can be any known input device technology, including but not limited to a keyboard (including a virtual keyboard), mouse, track ball, and touch-sensitive pad or display. Bus 1112 can be any known internal or external bus technology, including but not limited to ISA, EISA, PCI, PCI Express, NuBus, USB, Serial ATA or FireWire.

Computer-readable medium 1110 can be any medium that participates in providing instructions to processor(s) 1102 for execution, including without limitation, non-volatile storage media (e.g., optical disks, magnetic disks, flash drives, etc.) or volatile media (e.g., SDRAM, ROM, etc.). The computer-readable medium (e.g., storage devices, mediums, and memories) can include, for example, a cable or wireless signal containing a bit stream and the like. However, when mentioned, non-transitory computer-readable storage media expressly exclude media such as energy, carrier signals, electromagnetic waves, and signals per se.

Computer-readable medium 1110 can include various instructions for implementing operating system 1114 and applications 1120 such as computer programs. The operating system can be multi-user, multiprocessing, multitasking, multithreading, real-time and the like. The operating system 1114 performs basic tasks, including but not limited to: recognizing input from input device 1104; sending output to display device 1106; keeping track of files and directories on computer-readable medium 1110; controlling peripheral devices (e.g., disk drives, printers, etc.) which can be controlled directly or through an I/O controller; and managing traffic on bus 1112. Computer-readable medium 1110 can include various instructions for implementing firmware processes, such as a BIOS. Computer-readable medium 1110 can include various instructions for implementing any of processes described herein, including at least process 200 of FIG. 2.

Memory 1118 can include high-speed random access memory and/or non-volatile memory, such as one or more magnetic disk storage devices, one or more optical storage devices, and/or flash memory (e.g., NAND, NOR). The memory 1118 (e.g., computer-readable storage devices, mediums, and memories) can include a cable or wireless signal containing a bit stream and the like. However, when mentioned, non-transitory computer-readable storage media expressly exclude media such as energy, carrier signals, electromagnetic waves, and signals per se. The memory 1118 can store an operating system, such as Darwin, RTXC, LINUX, UNIX, OS X, WINDOWS, or an embedded operating system such as VxWorks.

System controller 1122 can be a service processor that operates independently of processor 1102. In some implementations, system controller 1122 can be a baseboard management controller (BMC). For example, a BMC is a specialized service processor that monitors the physical state of a computer, network server, or other hardware device using sensors and communicating with the system administrator through an independent connection. The BMC is configured on the motherboard or main circuit board of the device to be monitored. The sensors of a BMC can measure internal physical variables such as temperature, humidity, power-supply voltage, fan speeds, communications parameters and operating system (OS) functions.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java, Python), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computing system that includes a back-end component, such as a data server, or that includes a middleware component, such as an application server or an Internet server, or that includes a front-end component, such as a client computer having a graphical user interface or an Internet browser, or any combination thereof. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an application programming interface (API). An API can define one or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, and the like.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art. Numerous changes to the disclosed embodiments can be made in accordance with the disclosure herein, without departing from the spirit or scope of the disclosure. Thus, the breadth and scope of the present disclosure should not be limited by any of the above described embodiments.

Although certain aspects and features of the present disclosure have been illustrated and described with respect to one or more implementations, equivalent alterations and modifications will occur or be known to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application.

The terminology used herein is for the purpose of describing particular embodiments only, and is not intended to be limiting of the disclosure. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

One or more elements or aspects or steps, or any portion(s) thereof, from one or more of any of the claims below can be combined with one or more elements or aspects or steps, or any portion(s) thereof, from one or more of any of the other claims or combinations thereof, to form one or more additional implementations and/or claims of the present disclosure.

What is claimed is:

1. A system, comprising:

one or more data processors; and a non-transitory computer-readable storage medium containing instructions which, when executed on the one or more data processors, cause the one or more data processors to perform operations including:

receiving medical imaging data containing a plurality of ordered image slices;

accessing a multi-branch model associated with a target, wherein the multi-branch model includes a main branch and an attention branch, wherein the main branch includes a densely connected convolutional network (DenseNet) followed by a first segmentation head, wherein the attention branch includes a convolutional long short-term memory network (ConvLSTM) feeding into a second segmentation head and an attention head, wherein the multi-branch model is trained to receive sequential image slices and, for each sequential image slice, output a target mask indicative of one or more target regions within the sequential image slice identified as being the target, wherein a first output of the first segmentation head, a second output of the second segmentation head, and a third output of the attention head are used to generate the target mask;

providing the plurality of ordered image slices to the multi-branch model; and generating, by the multi-branch model, a plurality of output target masks in response to providing the plurality of ordered image slices to the multi-branch model.

2. The system of claim 1, wherein the operations further comprise generating a quantitative score using the plurality of output target masks, wherein the quantitative score is indicative of a severity of a condition associated with the target.

3. The system of claim 2, wherein generating the quantitative score includes:

calculating a total target volume using the plurality of output target masks; and generating a quantitative score using the total target volume.

4. The system of claim 3, wherein generating the quantitative score includes at least one of:

i) generating a coronary artery calcium score, wherein the target is calcium, and wherein the plurality of ordered image slices is associated with a computed tomography attenuation correction scan;

ii) generating a pneumonia burden score, wherein the target includes at least one of a ground-glass opacity lesion and a high opacity lesion, and wherein the plurality of ordered image slices is associated with a computed tomography study of a pleural cavity;

iii) generating a plaque volume measurement, wherein the target is plaque buildup, and wherein the plurality of ordered image slices is associated with a coronary computed tomography angiography study; or iv) generating a stenosis severity score, wherein the target is plaque buildup, and wherein the plurality of ordered image slices is associated with a coronary computed tomography angiography study.

5. The system of claim 1, wherein, for each image slice of the plurality of ordered image slices, generating the plurality of output target masks includes:

generating a main branch output by performing elementwise multiplication of the first output and the third output;

generating an attention branch output by performing elementwise multiplication of the second output and the third output; and generating a respective output target mask by performing elementwise addition of the main branch output and the attention branch output.

6. The system of claim 1, wherein each of the first segmentation head, the second segmentation head, and the attention head includes a 3×3 convolutional layer followed by a batch layer, followed by a leaky rectified linear unit layer, followed by an additional 3×3 convolutional layer, followed by an additional batch layer, followed by an additional leaky rectified linear unit layer, followed by a 1×1 convolutional layer, and wherein the attention head further includes a sigmoid layer following the 1×1 convolutional layer.

7. The system of claim 1, wherein the operations further comprise:

accessing an additional multi-branch model, wherein the multi-branch model is trained for segmentation according to the target, and wherein the additional multi-branch model is trained for segmentation according to an additional target;

providing the plurality of ordered image slices to the additional multi-branch model;

generating, by the additional multi-branch model, a plurality of output additional target masks in response to providing the plurality of ordered image slices to the additional multi-branch model, wherein the plurality of output additional target masks are indicative of one or more additional target regions within the plurality of ordered image slices identified as being the additional target; and applying the plurality of output additional target masks to the plurality of output target masks to generate a quantitative score, wherein the quantitative score is indicative of a severity of a condition associated with the one or more targets.

8. The system of claim 1, wherein the operations further comprise: training the multi-branch model using a set of training data, wherein the set of training data includes a plurality of manually annotated image sets, wherein each of the plurality of manually annotated image sets includes a plurality of ordered, annotated image slices, and wherein each respective image slice of the plurality of ordered, annotated image slices includes at least one manually-applied annotation indicative of an identified target region within the respective image slice.

9. The system of claim 1, wherein the operations further comprise: presenting the medical imaging data using a display device, wherein presenting the medical imaging data using the display device includes applying a visually distinguishable feature to the medical imaging data based on the plurality of output target masks such that the one or more target regions visible in the medical imaging data are visually distinguishable from other regions within the medical imaging data.

10. A computer-implemented method, comprising:

receiving medical imaging data containing a plurality of ordered image slices;

accessing a multi-branch model associated with a target, wherein the multi-branch model includes a main branch and an attention branch, wherein the main branch includes a densely connected convolutional network (DenseNet) followed by a first segmentation head, wherein the attention branch includes a convolutional long short-term memory network (ConvLSTM) feeding into a second segmentation head and an attention head, wherein the multi-branch model is trained to receive sequential image slices and, for each sequential image slice, output a target mask indicative of one or more target regions within the sequential image slice identified as being the target, wherein a first output of the first segmentation head, a second output of the second segmentation head, and a third output of the attention head are used to generate the target mask;

providing the plurality of ordered image slices to the multi-branch model; and generating, by the multi-branch model, a plurality of output target masks in response to providing the plurality of ordered image slices to the multi-branch model.

11. The computer-implemented method of claim 10, further comprising generating a quantitative score using the plurality of output target masks, wherein the quantitative score is indicative of a severity of a condition associated with the target.

12. The computer-implemented method of claim 11, wherein generating the quantitative score includes:

calculating a total target volume using the plurality of output target masks; and generating a quantitative score using the total target volume.

13. The computer-implemented method of claim 12, wherein generating the quantitative score includes at least one of:

i) generating a coronary artery calcium score, wherein the target is calcium, and wherein the plurality of ordered image slices is associated with a computed tomography attenuation correction scan;

ii) generating a pneumonia burden score, wherein the target includes at least one of a ground-glass opacity lesion and a high opacity lesion, and wherein the plurality of ordered image slices is associated with a computed tomography study of a pleural cavity;

iii) generating a plaque volume measurement, wherein the target is plaque buildup, and wherein the plurality of ordered image slices is associated with a coronary computed tomography angiography study; or iv) generating a stenosis severity score, wherein the target is plaque buildup, and wherein the plurality of ordered image slices is associated with a coronary computed tomography angiography study.

14. The computer-implemented method of claim 10, wherein, for each image slice of the plurality of ordered image slices, generating the plurality of output target masks includes:

generating a main branch output by performing elementwise multiplication of the first output and the third output;

generating an attention branch output by performing elementwise multiplication of the second output and the third output; and generating a respective output target mask by performing elementwise addition of the main branch output and the attention branch output.

15. The computer-implemented method of claim 10, wherein each of the first segmentation head, the second segmentation head, and the attention head includes a 3×3 convolutional layer followed by a batch layer, followed by a leaky rectified linear unit layer, followed by an additional 3×3 convolutional layer, followed by an additional batch layer, followed by an additional leaky rectified linear unit layer, followed by a 1×1 convolutional layer, and wherein the attention head further includes a sigmoid layer following the 1×1 convolutional layer.

16. The computer-implemented method of claim 10, further comprising:

accessing an additional multi-branch model, wherein the multi-branch model is trained for segmentation according to the target, and wherein the additional multi-branch model is trained for segmentation according to an additional target;

providing the plurality of ordered image slices to the additional multi-branch model;

generating, by the additional multi-branch model, a plurality of output additional target masks in response to providing the plurality of ordered image slices to the additional multi-branch model, wherein the plurality of output additional target masks are indicative of one or more additional target regions within the plurality of ordered image slices identified as being the additional target; and applying the plurality of output additional target masks to the plurality of output target masks to generate a quantitative score, wherein the quantitative score is indicative of a severity of a condition associated with the one or more targets.

17. The computer-implemented method of claim 10, further comprising: training the multi-branch model using a set of training data, wherein the set of training data includes a plurality of manually annotated image sets, wherein each of the plurality of manually annotated image sets includes a plurality of ordered, annotated image slices, and wherein each respective image slice of the plurality of ordered, annotated image slices includes at least one manually-applied annotation indicative of an identified target region within the respective image slice.

18. The computer-implemented method of claim 10, further comprising: presenting the medical imaging data using a display device, wherein presenting the medical imaging data using the display device includes applying a visually distinguishable feature to the medical imaging data based on the plurality of output target masks such that the one or more target regions visible in the medical imaging data are visually distinguishable from other regions within the medical imaging data.

19. A computer-program product tangibly embodied in a non-transitory machine-readable storage medium, including instructions configured to cause a data processing apparatus to perform operations including:

receiving medical imaging data containing a plurality of ordered image slices;

accessing a multi-branch model associated with a target, wherein the multi-branch model includes a main branch and an attention branch, wherein the main branch includes a densely connected convolutional network (DenseNet) followed by a first segmentation head, wherein the attention branch includes a convolutional long short-term memory network (ConvLSTM) feeding into a second segmentation head and an attention head, wherein the multi-branch model is trained to receive sequential image slices and, for each sequential image slice, output a target mask indicative of one or more target regions within the sequential image slice identified as being the target, wherein a first output of the first segmentation head, a second output of the second segmentation head, and a third output of the attention head are used to generate the target mask;

providing the plurality of ordered image slices to the multi-branch model; and generating, by the multi-branch model, a plurality of output target masks in response to providing the plurality of ordered image slices to the multi-branch model.

20. The computer-program product of claim 19, wherein the operations further comprise: presenting the medical imaging data using a display device, wherein presenting the medical imaging data using the display device includes applying a visually distinguishable feature to the medical imaging data based on the plurality of output target masks such that the one or more target regions visible in the medical imaging data are visually distinguishable from other regions within the medical imaging data.

* * * * *